(12) United States Patent
Sonehara

(10) Patent No.: US 7,625,093 B2
(45) Date of Patent: Dec. 1, 2009

(54) IMAGE DISPLAY DEVICE HAVING A PLURALITY OF BASIC-COLOR PROJECTION UNITS

(75) Inventor: Tomio Sonehara, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 446 days.

(21) Appl. No.: 11/388,993

(22) Filed: Mar. 27, 2006

(65) Prior Publication Data

US 2006/0221303 A1    Oct. 5, 2006

(30) Foreign Application Priority Data

Mar. 29, 2005  (JP) .............................. 2005-093430
Mar. 29, 2005  (JP) .............................. 2005-094840

(51) Int. Cl.
| | | |
|---|---|---|
| G03B 21/26 | (2006.01) | |
| G03B 21/14 | (2006.01) | |
| G02B 27/26 | (2006.01) | |
| G02B 27/22 | (2006.01) | |
| G02F 1/135 | (2006.01) | |

(52) U.S. Cl. .............................. 353/94; 353/20; 353/8; 359/465; 359/466; 349/30

(58) Field of Classification Search .................. 353/94, 353/20, 7, 8; 359/462, 464, 465, 466; 349/30
See application file for complete search history.

(56) References Cited

U.S. PATENT DOCUMENTS

| | | | |
|---|---|---|---|
| 5,012,274 A | 4/1991 | Dolgoff | |
| 5,300,942 A | 4/1994 | Dolgoff | |
| 5,602,679 A | 2/1997 | Dolgoff et al. | |
| 5,636,913 A | 6/1997 | Park | |
| 5,900,982 A | 5/1999 | Dolgoff et al. | |
| 6,147,802 A | 11/2000 | Itoh et al. | |
| 6,222,593 B1 | 4/2001 | Higurashi et al. | |
| 6,310,723 B1 | 10/2001 | Itoh et al. | |
| 6,344,927 B1 | 2/2002 | Itoh et al. | |
| 6,392,689 B1 | 5/2002 | Dolgoff | |
| 6,411,438 B1 | 6/2002 | Itoh et al. | |
| 6,416,186 B1 | 7/2002 | Nakamura | |
| 6,445,500 B1 | 9/2002 | Itoh | |
| 6,501,517 B1 | 12/2002 | Choi | |
| 6,538,705 B1 | 3/2003 | Higurashi et al. | |
| 6,667,834 B2 | 12/2003 | Itoh | |
| 6,846,082 B2 * | 1/2005 | Glent-Madsen et al. | ....... 353/94 |
| 7,119,957 B2 | 10/2006 | Itoh et al. | |

(Continued)

FOREIGN PATENT DOCUMENTS

JP    A-58-194487    11/1983

(Continued)

Primary Examiner—Diane I Lee
Assistant Examiner—Magda Cruz
(74) Attorney, Agent, or Firm—Oliff & Berridge, PLC

(57) ABSTRACT

An image display device includes a plurality of projection units, each of which having a light source section emitting one of basic-color lights, a spatial light modulation section modulating the basic-color light emitted from the light source section according to an image signal, and a projection system projecting an image based on the basic-color light modulated by the spatial light modulation section onto a screen. The projection units are arranged in an array, and the images, each of which is projected by each of the projection units, are combined on the screen to form a composite image.

19 Claims, 18 Drawing Sheets

U.S. PATENT DOCUMENTS

| | | |
|---|---|---|
| 2002/0093737 A1 | 7/2002 | Itoh et al. |
| 2003/0076423 A1 | 4/2003 | Dolgoff |
| 2004/0248022 A1* | 12/2004 | Yoshida et al. ............... 430/32 |
| 2007/0024974 A1 | 2/2007 | Itoh et al. |

FOREIGN PATENT DOCUMENTS

| | | |
|---|---|---|
| JP | A 1-179902 | 7/1989 |
| JP | A 1-189604 | 7/1989 |
| JP | A-2-76485 | 3/1990 |
| JP | A-02-281287 | 11/1990 |
| JP | A-02-309388 | 12/1990 |
| JP | A-03-243931 | 10/1991 |
| JP | A-04-204591 | 7/1992 |
| JP | A-04-207677 | 7/1992 |
| JP | A-04-505811 | 10/1992 |
| JP | A 5-107504 | 4/1993 |
| JP | A-6-34930 | 2/1994 |
| JP | A-7-87529 | 3/1995 |
| JP | 07234380 A * | 9/1995 |
| JP | A-07-234380 | 9/1995 |
| JP | A-08-106066 | 4/1996 |
| JP | A-08-304739 | 11/1996 |
| JP | A-09-326981 | 12/1997 |
| JP | A-10-269802 | 10/1998 |
| JP | A-2001-061121 | 3/2001 |
| JP | A-2001-069524 | 3/2001 |
| JP | A-2001-281599 | 10/2001 |
| JP | A 2002-72359 | 3/2002 |
| JP | A-2002-139794 | 5/2002 |
| JP | A 2003-185969 | 3/2003 |
| JP | A-2003-330110 | 11/2003 |
| JP | A-2004-205917 | 7/2004 |
| JP | A-2004-325629 | 11/2004 |
| JP | A-2004-349984 | 12/2004 |

* cited by examiner

IMAGE DISPLAY DEVICE HAVING A PLURALITY OF BASIC-COLOR PROJECTION UNITS

CROSS-REFERENCE TO RELATED APPLICATION

This application claims priority to Japanese Patent Application No. 2005-093430, filed on Mar. 29, 2005, and to Japanese Patent Application No. 2005-094840, filed on Mar. 29, 2005, the contents of which are incorporated herein by reference.

BACKGROUND

1. Technical Field

The present invention relates to an image display device.

2. Related Art

Rear-projection type image display devices (rear projectors), projecting color light from the rear side of a screen, are known as one example of an image display device (projector) projecting colored light containing image information, generated by a liquid crystal device or other spatial light modulation section, onto a screen via a projection system. In Japanese Unexamined Patent Application, First Publication No. 2003-185969, a stereoscopic image display device is disclosed projecting colored light with different polarization directions onto a screen, causing the projected image to be recognized by viewers as a stereoscopic image. Furthermore, Japanese Unexamined Patent Application, First Publication No. 2002-72359 discloses an image display device which combines a plurality of projected images of a projector side-by-side on a screen to present a large-size image.

However, in the above-described image display devices, the object plane of the projection system must be made to coincide with the light emission face of the spatial light modulation section, and the image plane of the projection system must be made to coincide with the screen, so that the light emission face of the spatial light modulation section and the screen are in a conjugate positional relation with respect to the projection system. In the technology of the prior art, a configuration is adopted in which a combining system, including a dichroic prism or similar, is provided between the spatial light modulation section and the projection system, and so a distance between the projection system and the light emission face of the spatial light modulation section (the backfocus of the projection system) must be secured sufficient to enable placement of the combining system. If the backfocus becomes too long, the distance between the projection system and the screen (the frontfocus of the projection system) also becomes long, and when using this image display device in a rear projector, this distance impedes efforts to reduce the size (reduce the thickness) of the rear projector. Furthermore, a long projection distance of the overall device has been necessary in order to enable application to large devices accommodating large projection spaces.

SUMMARY

An advantage of some aspects of the invention is to provide an image display device which can be realized compact.

A first aspect of the invention provides an image display device including a plurality of projection units, each of which having a light source section emitting one of basic-color lights, a spatial light modulation section modulating the basic-color light emitted from the light source section according to an image signal, and a projection system projecting an image based on the basic-color light modulated by the spatial light modulation section onto a screen. The projection units are arranged in an array, and the images, each of which is projected by each of the projection units, are combined on the screen to form a composite image.

It is preferable that, in the image display device of the first aspect of the invention, the projection units be orthogonally arranged in a grid array arrangement.

It is preferable that, in the image display device of the first aspect of the invention, the projection units be arranged in a staggered array arrangement.

According to this invention, by arranging projection units, the screen area can be covered without omission. It is possible to obtain a uniform display.

It is preferable that, in the image display device of the first aspect of the invention, the images based on the basic-color lights combined on the screen be superposed in areas corresponding to an orthogonal grid array arrangement of the projection units.

It is preferable that, in the image display device of the first aspect of the invention, the images based on the basic-color lights combined on the screen be superposed in areas corresponding to a staggered array arrangement of the projection units.

According to this invention, by superposing the image in the area corresponding to the arrangement in the array of the projection units, to form a composite image, it is possible to obtain a uniform image over the entire screen.

It is preferable that, in the image display device of the first aspect of the invention, the projection units include: a plurality of first polarized light projection units each of which projecting an image of a first polarization; and a plurality of second polarized light projection units each of which projecting an image of a second polarization. In addition, it is preferable that, each of the first polarized light projection units project onto the screen an image formed from one of the basic-color lights, each of the second polarized light projection units project onto the screen an image formed from one of the basic-color lights, and the images projected by the first polarized light projection units and by the second polarized light projection units be combined on the screen to form a composite image.

It is preferable that, in the image display device of the first aspect of the invention, the first polarized light projection units and the second polarized light projection units be orthogonally arranged in a grid array arrangement.

It is preferable that, in the image display device of the first aspect of the invention, the first polarized light projection units and the second polarized light projection units be arranged in a staggered array arrangement.

According to this invention, by arranging the first polarized light projection units and the second polarized light projection units in an orthogonal grid array arrangement or in a staggered array arrangement, the screen area can be covered without omission. It is possible to obtain a uniform display.

According to this invention, a plurality of projection clusters, in each of which are installed a plurality of first polarized light projection units capable of projecting different basic-color light with a first polarization and the second polarized light projection units capable of projecting different basic-color light with a second polarization, combine, on a screen, images projected by each of the projection units. In this case, color combining systems need not be provided in projection units, and the device size can be reduced. Furthermore, the structure of each of the projection units can be simplified.

It is preferable that the image display device of the first aspect of the invention, further include, glasses having a transmission portion for one eye of a viewer which transmits only the first polarized light projected from the first polarized light projection units via the screen, and a transmission portion for the other eye of the viewer which transmits only the second polarized light projected from the second polarized light projection units via the screen.

According to this invention, a viewer wearing the glasses can be caused to recognize a stereoscopic image.

It is preferable that, in the image display device of the first aspect of the invention, the images, each of which be formed from one of the basic-color lights, combined on the screen to form a composite image be superposed in an area corresponding to an orthogonal array arrangement of the first polarized light projection units and the second polarized light projection units.

It is preferable that, in the image display device of the first aspect of the invention, the images, each of which be formed from one of the basic-color lights, combined on the screen to form a composite image be superposed in an area corresponding to a staggered array arrangement of the first polarized light projection units and the second polarized light projection units.

According to this invention, by superposing polarized light images in an area corresponding to the arrangement of the first polarized light projection units and the second polarized light projection units, to form a composite image, it is possible to obtain a uniform stereoscopic image over the entire screen.

It is preferable that, in the image display device of the first aspect of the invention, the spatial light modulation section has a light emission face emitting the basic-color light, the light emission face be positioned to be perpendicular to an optical axis of the projection system, and a center axis of a light beam emitted from the light emission face be shifted from the optical axis of the projection system.

According to this invention, even if the central axis of the beam projected onto the screen is not orthogonal to the screen, the desired image can be formed on the screen.

A second aspect of the invention provides an image display device including a plurality of projection units, each of which having a light source section emitting one of basic-color lights, a spatial light modulation section modulating the basic-color light emitted from the light source section in response to an image signal, and a projection system projecting an image based on the basic-color light modulated by the spatial light modulation section onto a first surface. The projection units include: a plurality of first polarized light projection units each of which projecting an image of a first polarized light; and a plurality of second polarized light projection units each of which projecting an image of a second polarization. In addition, each of the first polarized light projection units projects onto the first surface an image formed from one of basic-color lights, each of the second polarized light projection units projects onto the first surface an image formed from one of the basic-color lights, and the images projected by the first polarized light projection units and by the second polarized light projection units are combined on the first surface to form a composite image.

According to this invention, the plurality of the first polarized light projection units capable of projecting different basic-color light of a first polarization and the plurality of the second polarized light projection units capable of projecting different basic-color light of a second polarization are provided, and by combining images projected from each of the polarized light projection units on a first surface, the desired composite image can be formed on the first surface. In this case, a combining system need not be provided in the projection units, so that the device size can be reduced. Moreover, the structure of each of the polarized light projection units can be simplified.

It is preferable that the image display device of the second aspect of the invention, further include, glasses having a transmission portion for one eye of a viewer which transmits only the first polarized light projected from the first polarized light projection units via the first surface, and a transmission portion for the other eye of the viewer which transmits only the second polarized light projected from the second polarized light projection units via the first surface.

According to this invention, a viewer wearing the glasses can be caused to recognize a stereoscopic image.

It is preferable that, in the image display device of the second aspect of the invention, each of the projection units have an emission face emitting one of the basic-color lights, and the emission faces be arranged side by side on a second surface which be in a prescribed position with respect to the first surface.

According to this invention, compared with a case in which a plurality of spatial light modulation sections are arranged in a complex manner, the structure of the overall device can be simplified, and the device size can be reduced.

It is preferable that, in the image display device of the second aspect of the invention, the emission faces be arranged side by side on the second surface, in a first direction and in a second direction different from the first direction.

According to this invention, the structure of the overall device can be simplified, and the device size can be reduced.

It is preferable that, in the image display device of the second aspect of the invention, the emission faces be arranged in mutual proximity on the second surface.

According to this invention, distortions in images projected onto the first surface from each of the projection units can be held to a minimum, and the desired image (composite image) can be obtained.

It is preferable that, in the image display device of the second aspect of the invention, each of the projection units have an emission face emitting one of the basic-color lights, and at least two of the projection units project from the emission faces basic-color lights being the same each other so that images of the same basic-color light be projected adjacent to each other on the first surface.

According to this invention, the effective brightness of the image formed on the first surface can be enhanced even, for example, when the aperture ratios of each of the projection units are small.

It is preferable that, in the image display device of the second aspect of the invention, the projection units include: a first basic-color light projection unit projecting a first basic-color light; a second basic-color light projection unit projecting a second basic-color light; and a third basic-color light projection unit projecting a third basic-color light. In addition, it is preferable that, the emission face of first basic-color light projection unit, the emission face of second basic-color light projection unit, and the emission face of third basic-color light projection unit be arranged in a staggered array arrangement on the second surface.

It is preferable that, in the image display device of the second aspect of the invention, the spatial light modulation section has a light emission face emitting the basic-color light, the light emission face be positioned to be perpendicular to an optical axis of the projection system, and a center axis of a light beam emitted from the light emission face be shifted from the optical axis of the projection system.

It is preferable that, in the image display device of the second aspect of the invention, the plurality of the above basic-color lights include red light, green light, and blue light.

According to this invention, the desired full-color image can be formed.

It is preferable that, in the image display device of the second aspect of the invention, the spatial light modulation section include a liquid crystal device. By this means, each projection unit can project the desired image.

It is preferable that, in the image display device of the second aspect of the invention, the light source section include a light-emitting diode.

According to this invention, each of projection units can project the desired basic-color light.

The light source sections can each have independent light flux control sections, so that light flux can be turned off or reduced. By this means, light can be projected with a broad dynamic range.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
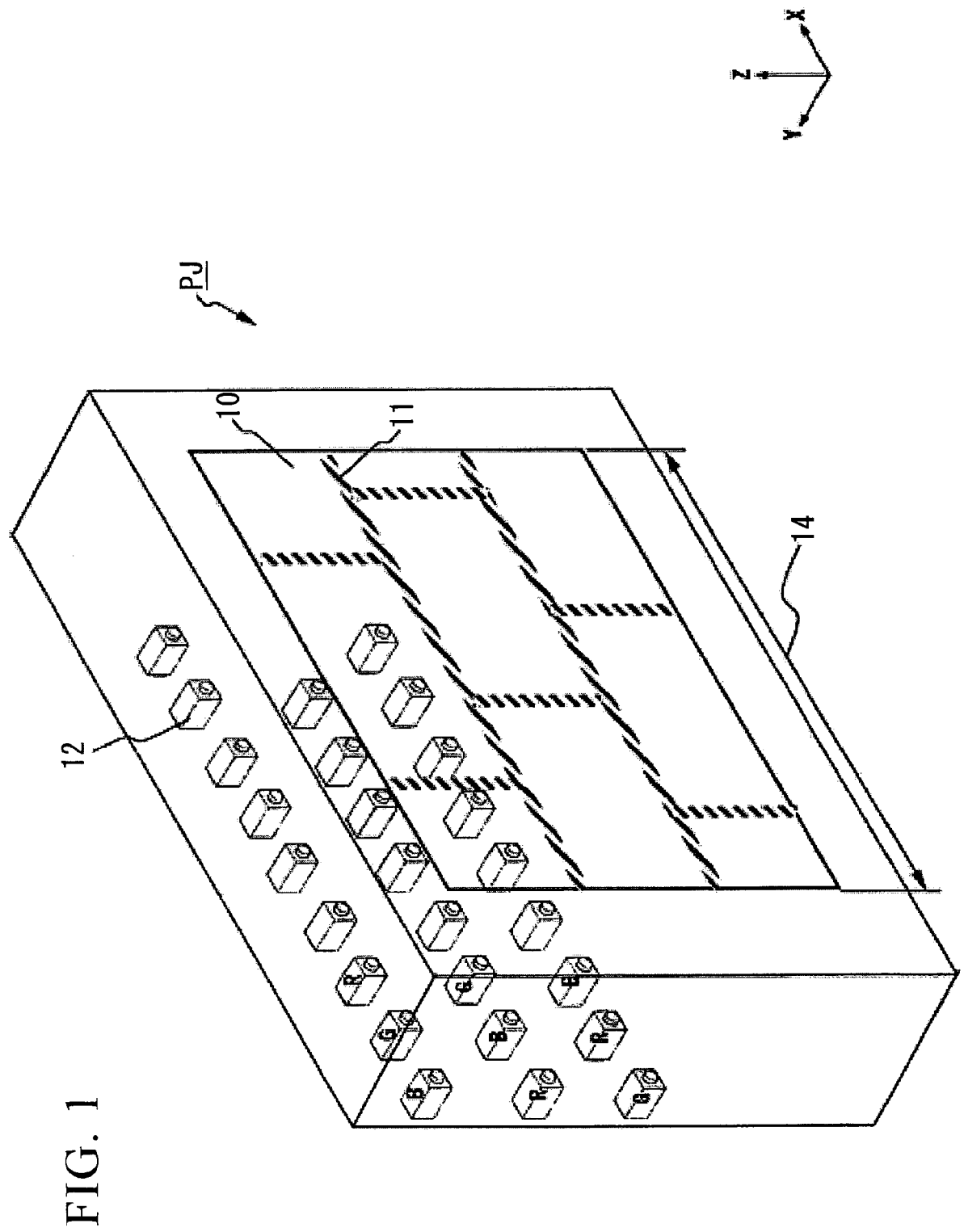
FIG. 1 is a view of a schematic configuration of an image display device in a first embodiment.

Below, embodiments of the invention are explained, referring to the drawings. In the explanations below, an XYZ orthogonal coordinate system is adopted, and positional relationships between members are explained referring to this XYZ orthogonal coordinate system. A prescribed direction within the horizontal plane is the X-axis direction; the direction orthogonal to the X-axis direction in the horizontal plane is the Y-axis direction; and the direction orthogonal to both the X-axis and Y-axis directions (that is, the vertical direction) is the Z-axis direction. Moreover, directions of rotation about the X axis, Y axis, and Z axis are, respectively, the θX, θY, and θZ directions.

First Embodiment

FIG. 1 is a view of a schematic configuration of the image display device of a first embodiment. In FIG. 1, the image display device PJ has a screen 10 and a plurality of projection units 12. Each of the projection units 12 projects an image onto the screen 10. The projection units 12 are basic-color image projection devices. In FIG. 1, "R", "G" and "B" denote the basic colors assigned to projection units when the basic colors are red (R), green (G), and blue (B). Furthermore, basic colors assigned to projection units are repeated, so that tin FIG. 1 the pattern repeated from the left side is shown. Basic-color images projected by the plurality of projection units form a composite image on the screen 10, with the position, brightness, chromaticity, and continuity maintained with images on the periphery of the blending areas 11. The image display device PJ of this embodiment is a so-called rear projector, or rear-projection type image display device which projects the image onto the screen 10 from the rear side of the screen 10. In the following explanation, the image display device will for convenience be called a "projector".

A plurality of projection units are provided on the rear side of the screen 10, in a prescribed positional relationship. In this embodiment, the plurality of the projection units is orthogonally arranged side by side in a grid array arrangement on the rear side of the screen 10. The images projected by each of the red light projection units, green light projection units, and blue light projection units are combined on the screen 10, to form a full-color composite image on the screen 10. The viewer views, from the front side, the image (composite image) projected onto the screen 10 from the rear side of the screen 10.

This composite image can be created by a method described in Japanese Unexamined Patent Application, First Publication No. 2002-72359, in which a single image is analyzed by projection units, and the analyzed images are distributed among the projection units. In this method, adjacent parts of the projected images are overlapped so that the overlapped adjacent parts are not visible, and the composite image is formed when the images projected from the projection units are formed on the screen.

In FIG. 1, projection units are orthogonally arranged in a grid array arrangement. The basic colors are arranged, from the left, in the order B, G, R in the upper row, R, B, G in the middle row, and G, R, B in the bottom row. Hence the positions of projected images are also similarly arranged. In FIG. 1, in order that overlapping projected images intermixed in blending areas without inconsistency, projection units projecting the same basic color must cover screen areas without omission, in order to obtain a uniform display. The blending areas 11 shown in FIG. 1 are areas for green (G). Similarly, blending areas for blue (B) and red (R) are shifted horizontally from the blending areas for green in units of the intervals between projection units.

In FIG. 1, when projection units are orthogonally arranged in a grid array arrangement, the area in which all basic colors are projected and a complete image is reproduced is the center portion. This is because there is a deficiency of basic-color images in the peripheral portions. In the arrangement of FIG. 1, deficiencies do not occur in the upper and lower directions, but do occur in the periphery on the right and left.

Figure 2:
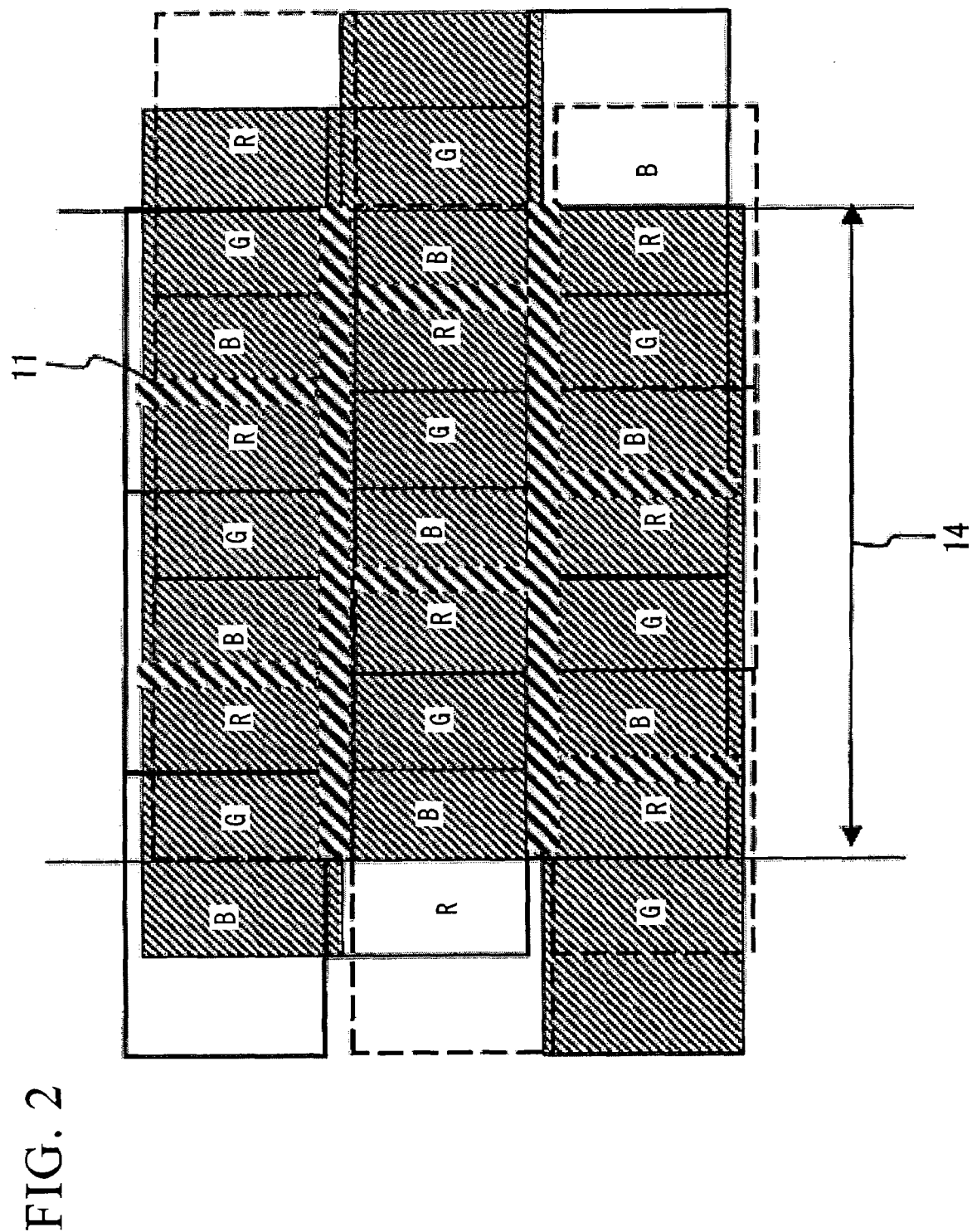
FIG. 2 is a view for explaining an arrangement of basic-color images projected onto a screen.

FIG. 2 is a view of the arrangement of basic-color images projected onto the screen. Blue (B) images are projected into white-framed areas, green (G) images are projected into obliquely-shaded areas, and red (R) images are projected into areas enclosed by broken lines. In order to make overlap explicitly, each of the areas is drawn shifted upward and downward somewhat. There are partial deficiencies in basic-color images in the peripheral areas on the left and right. In FIG. 2, substantially ⅔ of the width of a projected image is a deficient area. The screen area 14 shown in FIG. 1 and FIG. 2 is an aperture portion designed such that deficient areas cannot be observed. In FIG. 2, reference symbol 11 indicates blending areas in which green (G) images which can be observed from the screen are superposed.

Figure 3:
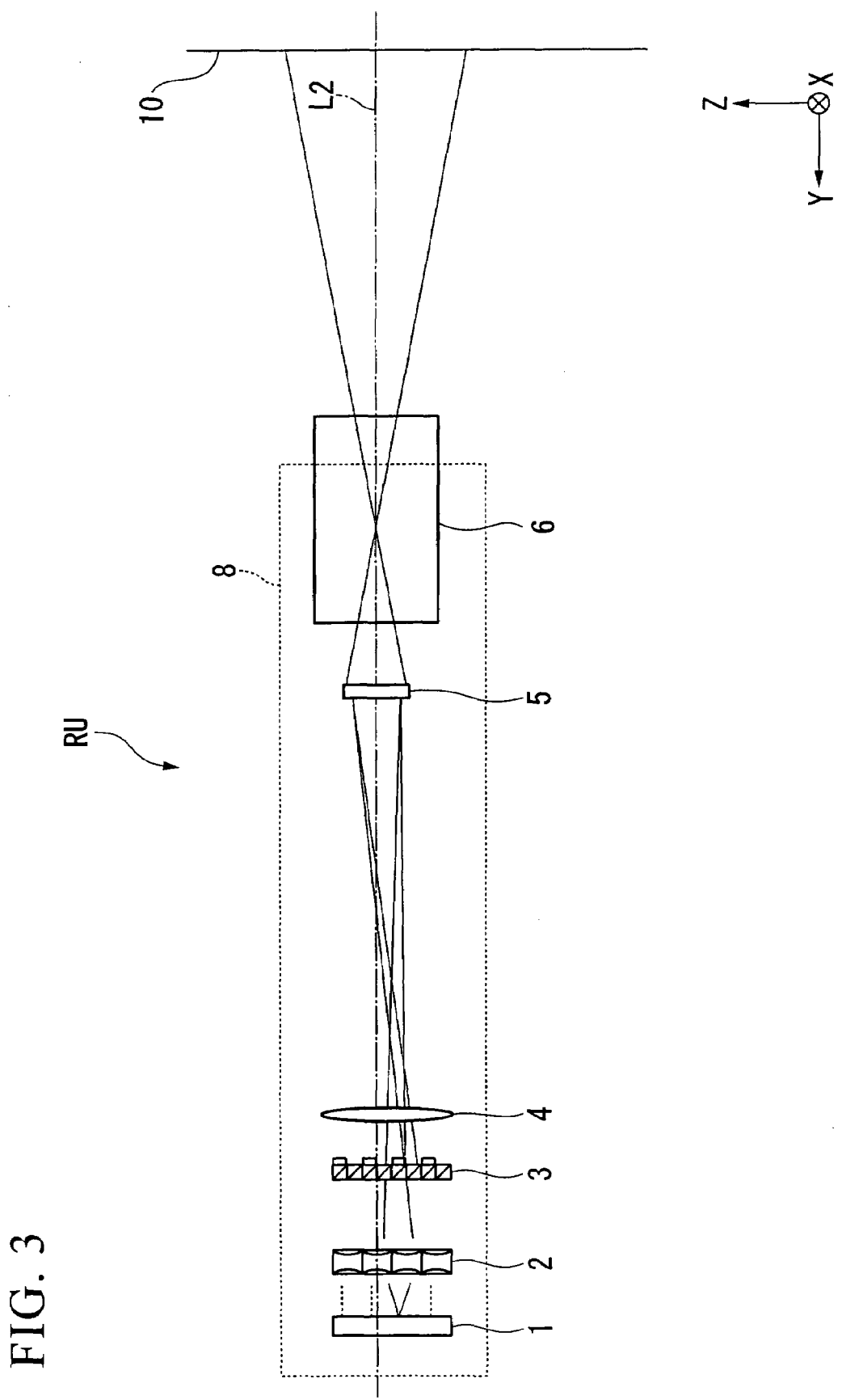
FIG. 3 is a view of a schematic configuration of a projection unit.

FIG. 3 is a view of a schematic configuration of a red light projection unit RU. In FIG. 3, a projection unit RU has: a light source section 1 emitting red light; an integrator system 2 rendering uniform the illumination of red light emitted from the light source section 1; a polarization conversion device 3 arranging the polarization direction of red light transmitted by the integrator system 2; a lens system 4; a spatial light modulation section 5 performing optical modulation of the red light transmitted by the polarization conversion device 3 and lens system 4 response to an image signal; and, a projection system (projection optical system) 6 projecting onto a screen 10 the image based on the red light modulated by the spatial light modulation section 5. The light source section 1, integrator system 2, polarization conversion device 3, lens system 4, spatial light modulation section 5, and projection system 6 are each held by a holding member (housing) 8.

The light source section 1 of a projection unit RU has a light-emitting diode (LED) emitting red light. The integrator system 2 includes, for example, a fly-eye lens, and renders uniform the illumination of red light. The red light is emitted from the light source section 1, and irradiated to the polarization conversion device 3. The polarization conversion device 3 has a polarizing beam splitter (hereafter "PBS array"). The PBS array has a polarization separation film and phase difference plate (½λ plate). A polarization separation film of the PBS array in this embodiment passes, for example, the P-polarization component of the red light from the integrator system 2, and changes by 90° the optical path of the S-polarization component. The S-polarization component with changed optical path is reflected by an adjacent reflective member and is emitted without further modification. On the other hand, the P-polarization component, after transmission by the polarization separation film, is converted into an S-polarization component by a phase difference plate provided on the light emission side, and is emitted. That is, in FIG. 2, substantially all of the red light incident on the polarization conversion device 3 is converted into the S-polarization.

The spatial light modulation section 5 has a liquid crystal device (hereafter, where appropriate, "light valve"). The light valve has an incidence-side polarizing plate, a panel portion having liquid crystals sealed between a pair of glass substrates, and an emission-side polarizing plate. Pixel electrodes and an alignment film are provided on the glass substrates. Red light incident on the spatial light modulation section 5 is optically modulated upon passing through the spatial light modulation section 5. In FIG. 2, light emitted from the spatial light modulation section 5 is S-polarization red-color light. The red-color light optically modulated by the spatial light modulation section 5 (modulated light) is projected onto the screen 10 by the projection system 6. The projection system 6 is a so-called enlarging system which enlarges the incidence-side image and projects the image onto the screen 10. Thus the red light projection unit RU projects an image, consisting of red-color light, onto the screen 10.

In the above, a red light projection unit RU has been explained, the other projection units GU, BU are configured in substantially the same manner as the projection unit RU shown in FIG. 2. That is, the light source section 1 of the green light projection unit GU has an LED emitting green light, and the light source section 1 of the blue light projection unit BU has an LED emitting blue light.

Second Embodiment

Figure 4:
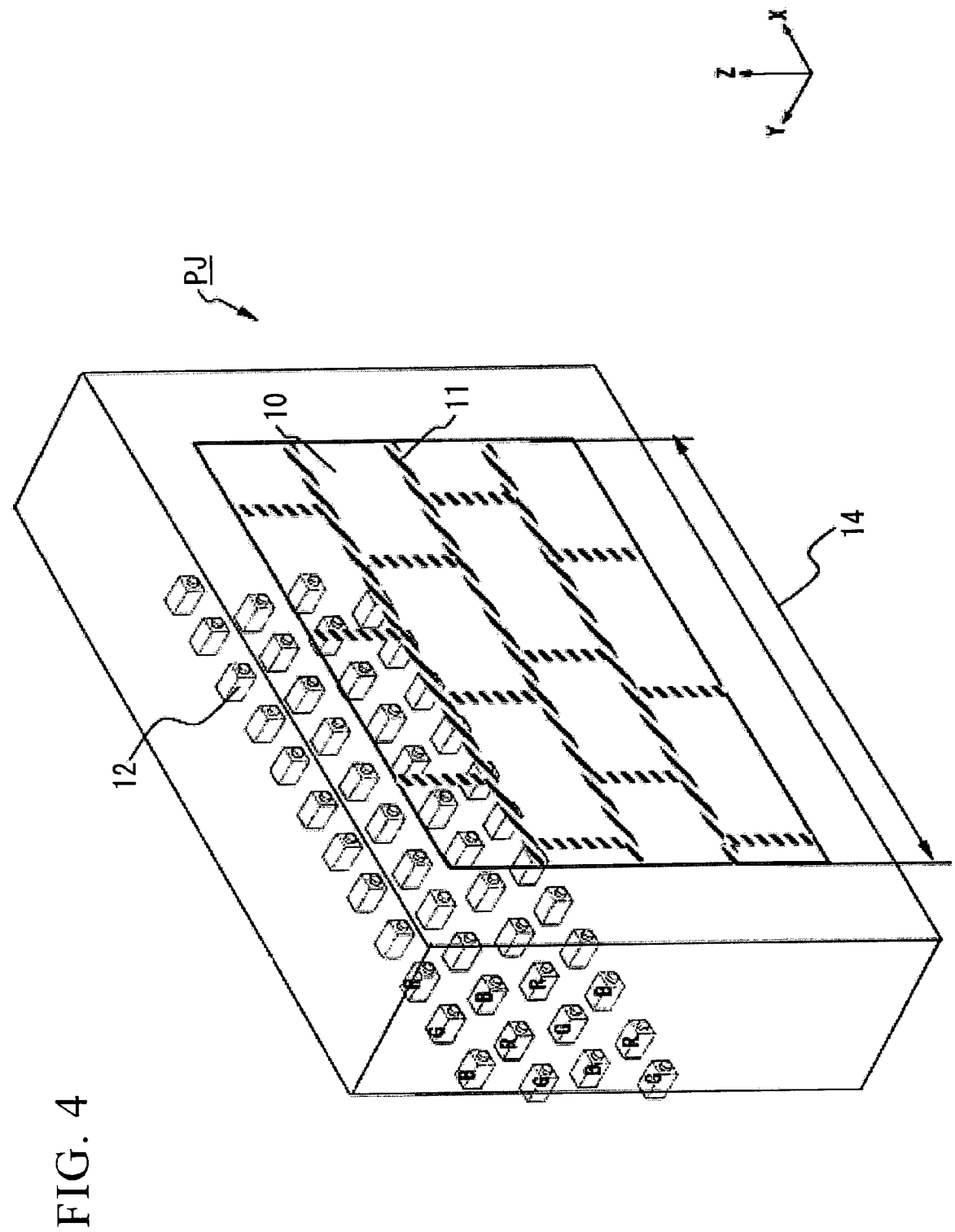
FIG. 4 is a view of a schematic configuration of an image display device in a second embodiment.

FIG. 4 is a view of a schematic configuration of the image display device of a second embodiment. In FIG. 4, the image display device PJ has a screen 10 and a plurality of projection units 12. Each of the projection units 12 projects an image onto the screen 10. The projection units 12 are basic-color image display devices. In FIG. 4, "R", "G" and "B" indicate basic colors assigned to projection units when the basic colors are red (R), green (G) and blue (B). The basic color assignments of the projection units are repeated, and in FIG. 4 a pattern repeated from the left side is shown. The basic-color images projected from the plurality of projection units form a composite image on the screen 10, with the positions and continuity of brightness and chromaticity at the peripheries of images maintained in the blending areas 11. The image display device PJ of this embodiment is a rear projector projecting an image onto the screen 10 from the rear side of the screen 10.

The plurality of projection units, include the red-light projection units, green-light projection units, and blue-light projection units.

Images projected from each of the red-light projection units, green-light projection units, and blue-light projection units are combined on the screen 10, to form a full-color composite image on the screen 10. The viewer views, from the front side, the image (composite image) projected onto the screen 10 from the rear side of the screen 10.

This composite image can be created by a method described in Japanese Unexamined Patent Application, First Publication No. 2002-72359, in which a single image is analyzed by projection units, and the analyzed images are distributed among the projection units. In this method, adjacent parts of the projected images are overlapped so that the overlapped adjacent parts are not visible, and the composite image is formed when the images projected from the projection units are formed on the screen.

In FIG. 4, the projection units are arranged in a staggered array arrangement. The projection units are arranged at each of the corner points of a triangular array in which triangular shapes are connected, that is, at the points of intersection of a so-called delta-shape matrix. Basic colors are arranged in the order, from the left, of B, G, R in the top row, G, R, B in the middle row, and B, G, R in the bottom row. When arranged in a delta shape, all groups of proximate projection units always have the R, G, B basic colors at each of the corner points of the delta shapes. This delta arrangement has the feature of enabling uniform placement of basic-color images without waste. The positions of projected images are also similarly arranged. In FIG. 4, in order that overlapping projected images intermixed in blending areas without inconsistency, projection units projecting the same basic color must cover screen areas without omission. The blending areas 11 shown in FIG. 4 are areas for green (G). Similarly, blending areas for blue (B) and red (R) are shifted horizontally from the blending areas for green in units of the intervals between projection units.

When projection units for each of the basic colors are arranged in a staggered array arrangement in FIG. 4, the area in which all basic colors are projected and a complete image is reproduced is the center portion. This is because there is a deficiency of basic-color images in the peripheral portions. In the arrangement of FIG. 4, deficiencies do not occur in the upper and lower directions, but do occur in the periphery on the right and left.

Figure 5:
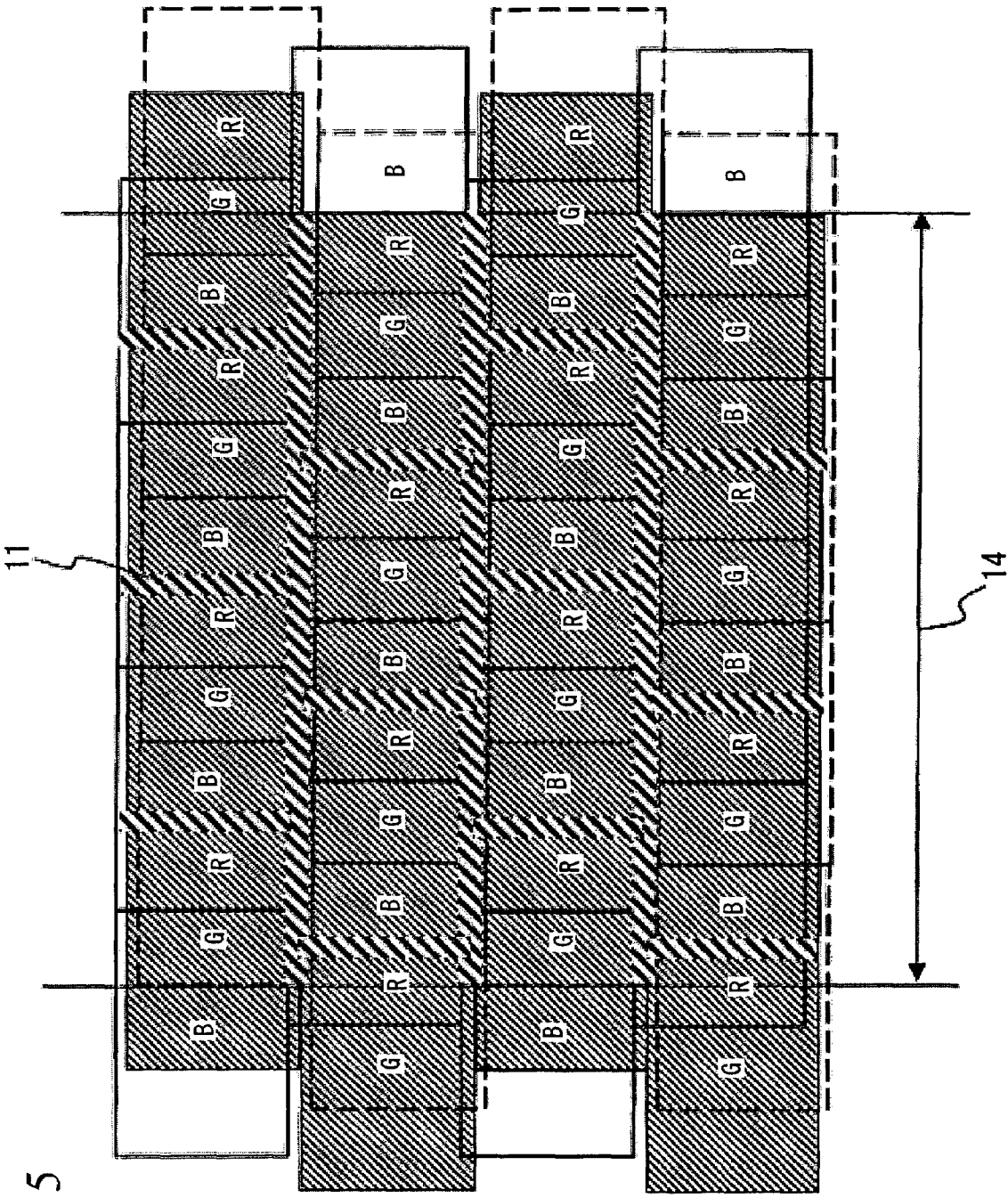
FIG. 5 is a view for explaining an arrangement of basic-color images projected onto a screen.

FIG. 5 is a view of the arrangement of basic-color images projected onto the screen. Blue (B) images are projected into white-framed areas, green (G) images are projected into colored areas, and red (R) images are projected into areas enclosed by broken lines. In order to make overlap explicit, each of the areas is drawn shifted upward and downward somewhat. There are partial deficiencies in basic-color images in the peripheral areas on the left and right. In FIG. 5, substantially ⅔ of the width of a projected image is a deficient area. The screen area 14 shown in FIG. 4 and FIG. 5 is an aperture portion designed such that deficient areas cannot be observed. In FIG. 5, reference symbol 11 indicates blending areas for green (G) images which can be observed from the screen.

The projection units employed in the second embodiment are equivalent to those used in the first embodiment shown in FIG. 3.

Third Embodiment

Figure 6:
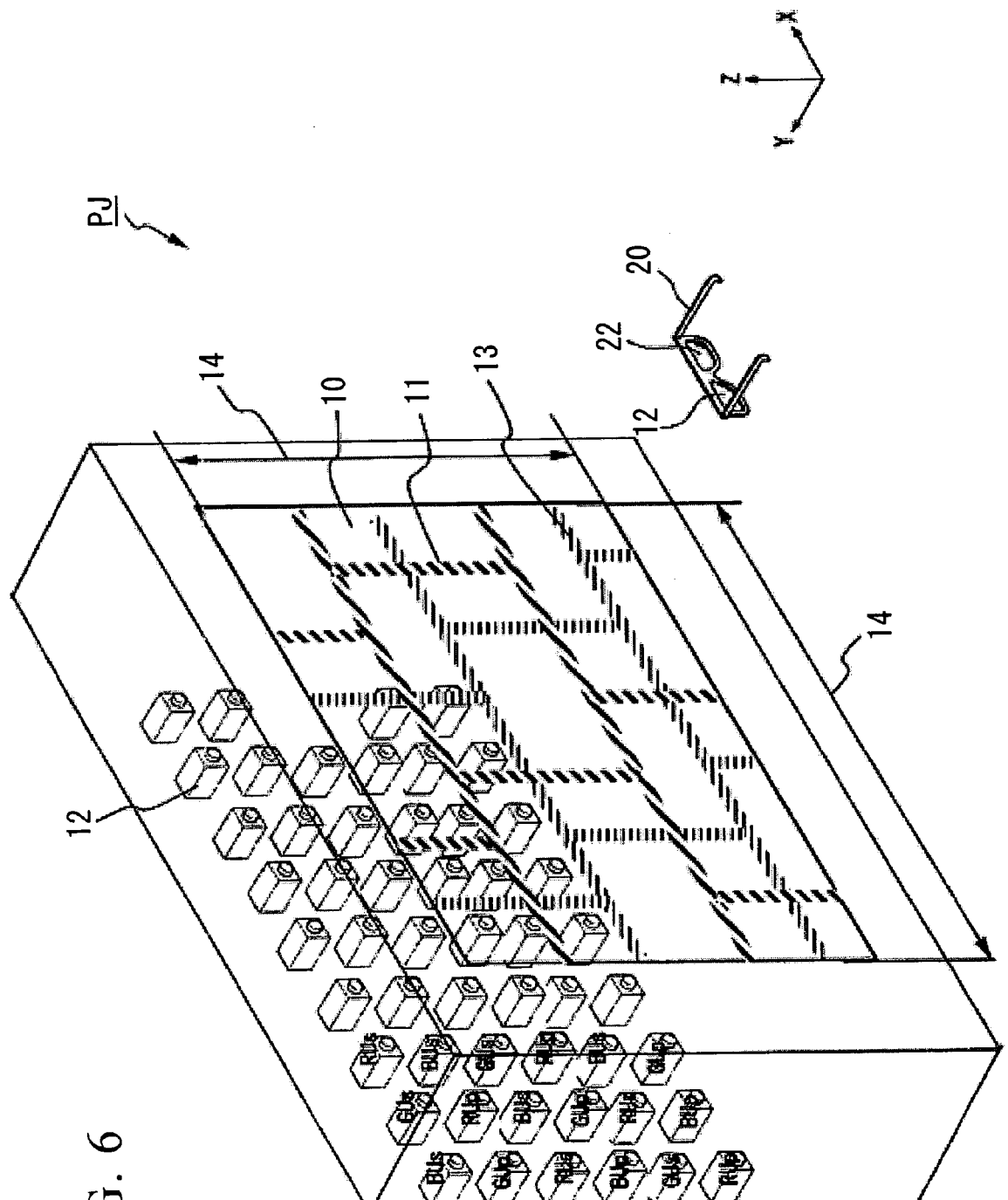
FIG. 6 is a view of a schematic configuration of an image display device in a third embodiment.

FIG. 6 is a view of a schematic configuration of the image display device of a third embodiment. In FIG. 6, the image display device PJ has a screen 10 and a plurality of projection units 12. Each of the projection units 12 projects an image onto the screen 10. The projection units 12 are image display devices for basic-color light polarized in an orthogonal relationship. In FIG. 6, reference symbols RUs, GUs, BUs denote projection units which emit S-polarized light in the basic colors red (R), green (G), and blue (B). Reference symbols RUp, GUp, BUp denote projection units which emit P-polarized light in the basic colors red (R), green (G) and blue (B). The basic color assignments of the projection units are repeated, and in FIG. 6 a pattern repeated from the left side is shown. The polarized-light basic-color images projected from the plurality of projection units form a composite image on the screen 10, with the positions and continuity of brightness and chromaticity at the peripheries of images maintained in the blending areas 11. The image display device PJ of this embodiment is a rear projector which projects an image onto the screen 10 from the rear side of the screen 10.

The plurality of projection units RUs, RUp, GUs, GUp, BUs, BUp are provided in a prescribed positional relationship on the rear side of the screen 10. In this embodiment, the plurality of projection units RUs, RUp, GUs, GUp, BUs, BUp are orthogonally arranged side by side in a grid array arrangement on the rear side of the screen 10. The images respectively projected by the red-light projection units RUs, RUp, green-light projection units GUs, GUp, and blue-light projection units BUs, BUp are combined on the screen 10, to form a full-color composite image on the screen 10. The viewer uses glasses 20 or similar, which separate the polarized light, to view, from the front side, the image (composite image) projected onto the screen 10 from the rear side of the screen 10. As shown in FIG. 6, the viewer, by wearing glasses 20 having an S-polarized light transmitting film 21 on the left side and a P-polarized light transmitting film 22 on the right side, can perceive a stereoscopic image. Here, the S-polarized light transmitting film 21 on the left side of the glasses 20 functions as a transmission portion for the left eye to transmit only S-polarized light emitted, via the screen 10 from the S-polarized red light projection units RUs, S-polarized green light projection units GUs, and S-polarized blue light projection units BUs; and the P-polarized light transmitting film 22 on the right side of the glasses 20 functions as a transmission portion for the right eye to transmit only P-polarized light emitted, via the screen 10 from the P-polarized red light projection units RUp, P-polarized green light projection units GUp, and P-polarized blue light projection units BUp.

In FIG. 6, projection units are orthogonally placed in a grid array arrangement. The placement of basic colors corresponding to S-polarized light is, from the top row to the bottom row, from the left, in the order B, G, R, then in the middle row R, B, G, and in the next row G, R, B. The placement of basic colors correspond to P-polarized light is, from the top row to the bottom row, from the left, in the order G, R, B, then in the middle row B, G, R, and in the next row R, B, G. This basic color order adopts a periodic arrangement such that there is no local unevenness of a specific color.

The positions of projected images are also similarly arranged in response to the arrangement of projection units. In FIG. 6, in order that overlapping projected images intermixed in blending areas without inconsistency, projection units projecting the same basic color and the same polarization must cover screen areas without omission. The blending areas 11 shown in FIG. 1 are areas for S-polarized green (G) light. The blending areas 13 are areas for P-polarized green (G) light. Similarly, blending areas for blue (B) and red (R) are shifted horizontally from the blending areas for green in units of the intervals between projection units.

When projection units for each of the basic colors are orthogonally arranged in a grid array arrangement in FIG. 6, the area in which all basic colors of both polarizations are projected and a complete image is reproduced is the center portion. This is because there is a deficiency of polarized-light or basic-color images in the peripheral portions.

Figure 7:
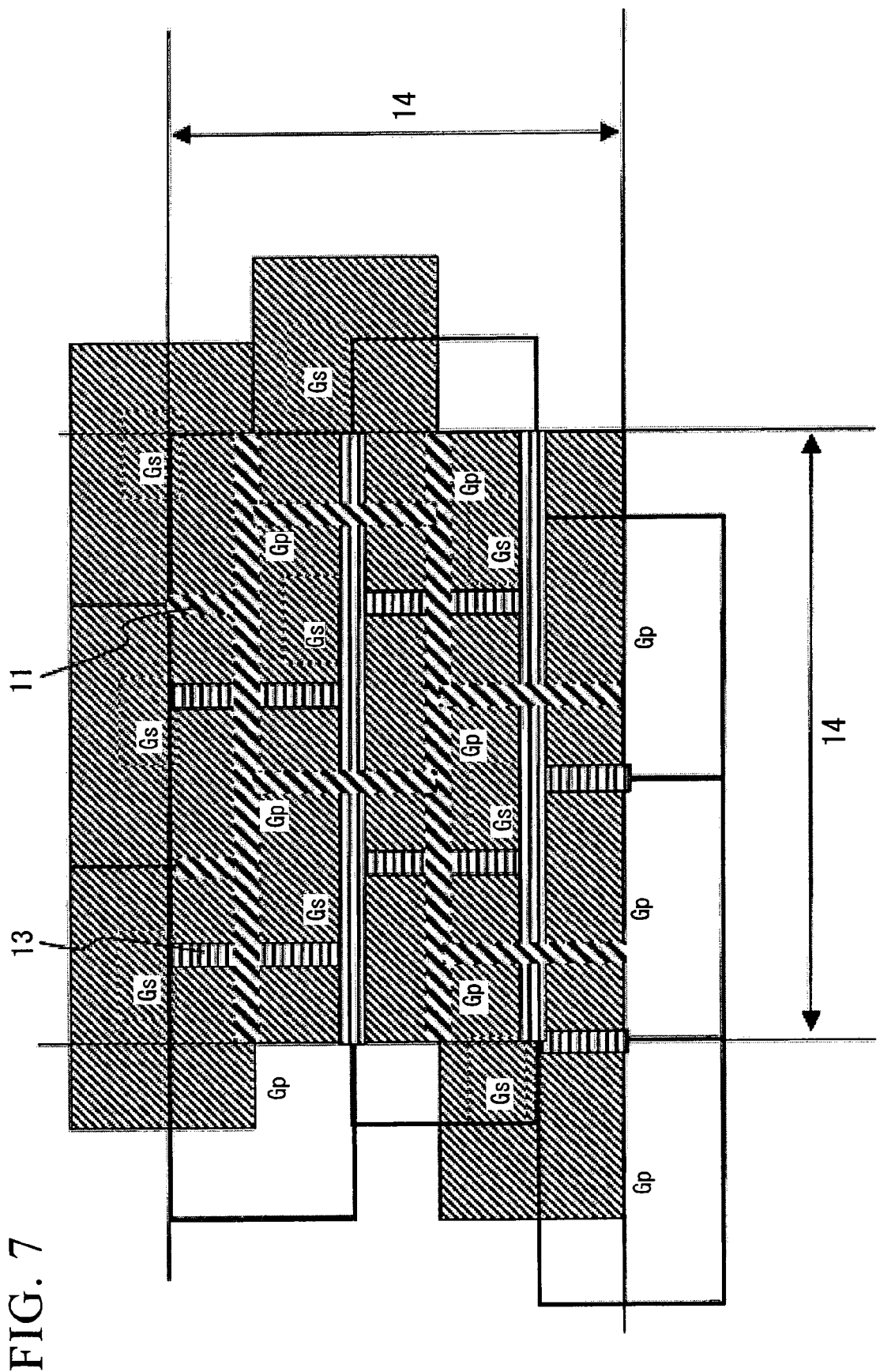
FIG. 7 is a view for explaining an arrangement of basic-color images projected onto a screen.

FIG. 7 is a view of the arrangement of polarized-light basic-color images projected onto the screen. FIG. 7 shows schematically, so that only the image areas of S-polarization and P-polarization of green (G) light are shown. The S-polarized light image areas denoted by Gs are colored portions, and the P-polarized light image areas denoted by Gp are white-border portions. There exist deficient areas in which polarized light is not projected in all the peripheral areas above, below, on the left and right. There also exist areas deficient in the basic colors G, B, R in the peripheral areas on the left and right. The screen area 14 shown in FIG. 6 and FIG. 7 is an aperture portion designed so as to render ineffective the deficient areas. In FIG. 7, reference symbol 11 indicates blending areas for S-polarization green (G) images, and reference symbol 13 indicates blending areas for P-polarization green (G) images, which can be observed from the screen.

The projection units employed in the third embodiment are equivalent to those used in the first embodiment shown in FIG. 3.

In the first and second embodiments, the polarization performance of the projection units does not affect the formation of images, but in the third embodiment, it is necessary to minimize crosstalk between orthogonally polarized light in order to divide the right and left images based on polarization. To this end, it is effective to place polarizing plates or similar on each of the projection units as appropriate, to further intensify the polarization.

That is, in the projection unit of FIG. 3, a light source section 1 in a P-polarized red light projection unit RUp is provided with an LED emitting red light, and the red light emitted from the spatial light modulation section 5 of the P-polarized red light projection unit RUp is P-polarized light. A light source section 1 in an S-polarized green light projection unit GUs has an LED emitting green light, and the green light emitted from the spatial light modulation section 5 of the S-polarized green light projection unit GUs is S-polarized light. Furthermore, a light source section 1 in a P-polarized green light projection unit GUp has an LED emitting green light, and the green light emitted from the spatial light modulation section 5 of the P-polarized green light projection unit GUp is P-polarized light. A light source section 1 in an S-polarized blue light projection unit BUs has an LED emitting blue light, and the blue light emitted from the spatial light modulation section 5 of the S-polarized blue light projection unit BUs is S-polarized light. Furthermore, a light source section 1 in a P-polarized blue light projection unit BUp has an LED emitting blue light, and the blue light emitted from the spatial light modulation section 5 of the P-polarized blue light projection unit BUp is P-polarized light. Polarization conversion devices can be placed as appropriate on the emission face side of the projection systems 6 of each of the projection units.

Fourth Embodiment

Figure 8:
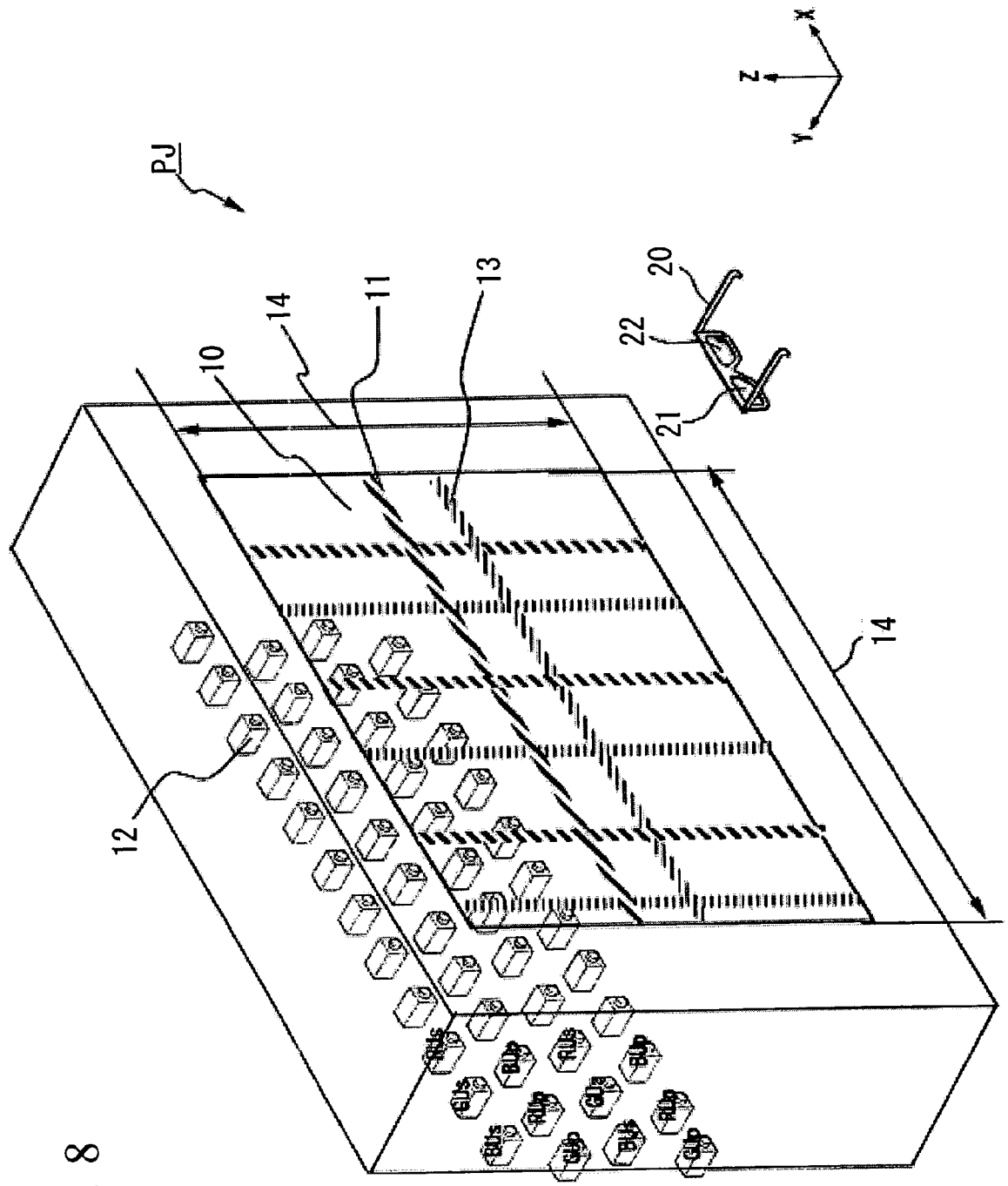
FIG. 8 is a view of a schematic configuration of an image display device in a fourth embodiment.

FIG. 8 is a view of a schematic configuration of the image display device of a fourth embodiment. In FIG. 8, the image display device PJ has a screen 10 and a plurality of projection units 12. Each of the projection units 12 projects an image onto the screen 10. The projection units 12 are image display devices for basic-color light polarized in an orthogonal relationship. In FIG. 8, reference symbols RUs, GUs, BUs denote projection units which emit S-polarized light in the basic colors red (R), green (G), and blue (B). Reference symbols RUp, GUp, BUp denote projection units which emit P-polarized light in the basic colors red (R), green (G) and blue (B). The basic color assignments of the projection units are repeated, and in FIG. 8 a pattern repeated from the left side is shown. The basic-color images projected from the plurality of projection units form a composite image on the screen 10, with the positions and continuity of brightness and chromaticity at the peripheries of images maintained in the blending areas 11. The image display device PJ of this embodiment is a rear projector which projects an image onto the screen 10 from the rear side of the screen 10.

The plurality of projection units RUs, RUp, GUs, GUp, BUs, BUp are provided in a prescribed positional relationship on the rear side of the screen 10. In this embodiment, the plurality of projection units RUs, RUp, GUs, GUp, BUs, BUp are orthogonally arranged side by side in a grid array arrangement on the rear side of the screen 10. The images respectively projected by the red-light projection units RUs, RUp, green-light projection units GUs, GUp, and blue-light projection units BUs, BUp are combined on the screen 10, to form a full-color composite image on the screen 10. The viewer uses glasses 20 or similar, which separate the polarized light, to view, from the front side, the image (composite image) projected onto the screen 10 from the rear side of the screen 10. As shown in FIG. 8, the viewer, by wearing glasses 20 having an S-polarized light transmitting film 21 on the left side and a P-polarized light transmitting film 22 on the right side, can perceive a stereoscopic image. Here, the S-polarized light transmitting film 21 on the left side of the glasses 20 functions as a transmission portion for the left eye to transmit only S-polarized light emitted, via the screen 10 from the S-polarized red light projection units RUs, S-polarized green light projection units GUs, and S-polarized blue light projection units BUs; and the P-polarized light transmitting film 22 on the right side of the glasses 20 functions as a transmission portion for the right eye to transmit only P-polarized light emitted, via the screen 10 from the P-polarized red light projection units RUp, P-polarized green light projection units GUp, and P-polarized blue light projection units BUp.

In FIG. 8, projection units are arranged in a staggered array arrangement. The placement of basic colors is, from the top row to the bottom row, from the left, in the order B, G, R, then in the next row G, R, B, in the next row B, G, R, and in the bottom row G, R, B. When arranged in a delta shape, all groups of proximate projection units always have the R, G, B basic colors at each of the corner points of the delta shapes. This delta arrangement has the feature of enabling uniform placement of basic-color images without waste.

The positions of projected images are also similarly arranged in response to the arrangement of projection units. In FIG. 8, in order that overlapping projected images intermixed in blending areas without inconsistency, projection units projecting the same basic color and the same polarization must cover screen areas without omission. The blending areas 11 shown in FIG. 8 are areas for S-polarized green (G) light images. The blending areas 13 are areas for P-polarized green (G) light images. Similarly, blending areas for blue (B) and red (R) are shifted horizontally from the blending areas for green in units of the intervals between projection units.

When projection units for each of the basic colors are arranged in a staggered array arrangement in FIG. 8, the area in which all basic colors of both polarizations are projected and a complete image is reproduced is the center portion. This is because there is a deficiency of images in one of the basic colors and in one of the polarizations in the peripheral portions.

Figure 9:
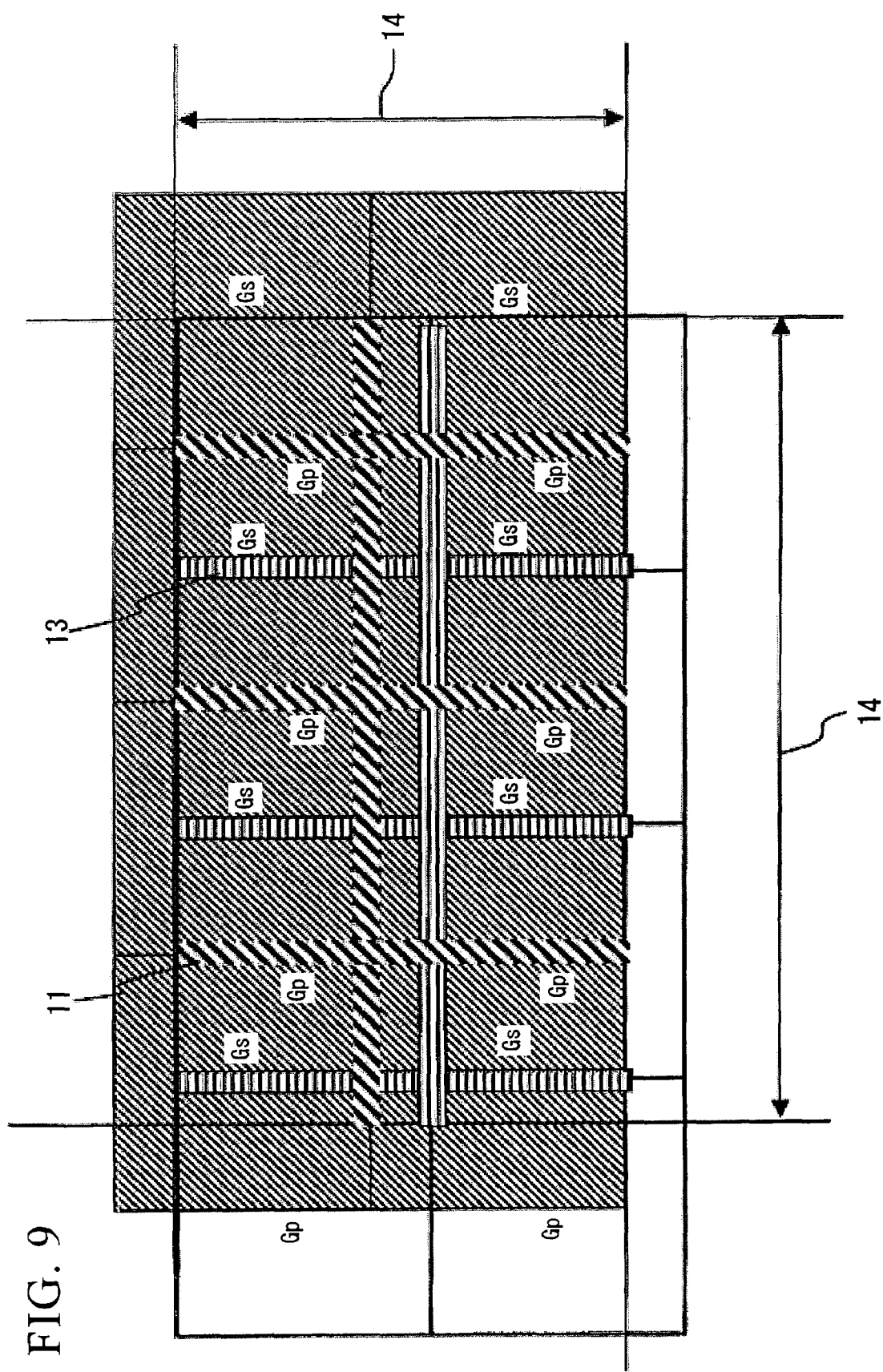
FIG. 9 is a view for explaining an arrangement of basic-color images projected onto a screen.

FIG. 9 is a view of the arrangement of polarized-light basic-color images projected onto the screen. FIG. 9 shows schematically, so that only the image areas of S-polarization and P-polarization of green (G) light are shown. The S-polarized light image areas denoted by Gs are colored portions, and the P-polarized light image areas denoted by Gp are white-border portions. There exist deficient areas in which polarized light is not projected in all the peripheral areas above, below, on the left and right. There also exist areas deficient in the basic colors G, B, R in the peripheral areas on the left and right. The screen area 14 shown in FIG. 8 and FIG. 9 is an aperture portion designed so as to render ineffective the deficient areas. In FIG. 9, reference symbol 11 indicates blending areas for S-polarization green (G) images, and reference symbol 13 indicates blending areas for P-polarization green (G) images, which can be observed from the screen.

The projection units employed in the fourth embodiment are equivalent to those used in the first embodiment shown in FIG. 3.

In the first and second embodiments, the polarization performance of the projection units does not affect the formation of images, but in the fourth embodiment, it is necessary to minimize crosstalk between orthogonally polarized light in order to divide the right and left images based on polarization. To this end, it is effective to place polarizing plates or similar on each of the projection units as appropriate, to further intensify the polarization.

That is, in the projection unit of FIG. 3, a light source section 1 in a P-polarized red light projection unit RUp is provided with an LED emitting red light, and the red light emitted from the spatial light modulation section 5 of the P-polarized red light projection unit RUp is P-polarized light. A light source section 1 in an S-polarized green light projection unit GUs has an LED emitting green light, and the green light emitted from the spatial light modulation section 5 of the S-polarized green light projection unit GUs is S-polarized light. Furthermore, a light source section 1 in a P-polarized green light projection unit GUp has an LED emitting green light, and the green light emitted from the spatial light modulation section 5 of the P-polarized green light projection unit GUp is P-polarized light. A light source section 1 in an S-polarized blue light projection unit BUs has an LED emitting blue light, and the blue light emitted from the spatial light modulation section 5 of the S-polarized blue light projection unit BUs is S-polarized light. Furthermore, a light source section 1 in a P-polarized blue light projection unit BUp has an LED emitting blue light, and the blue light emitted from the spatial light modulation section 5 of the P-polarized blue light projection unit BUp is P-polarized light. Polarization conversion devices can be placed as appropriate on the emission face side of the projection systems 6 of each of the projection units.

As explained above, by combining, on the screen 10, images projected by projection units capable of projecting red light, green light and blue light, the desired full-color composite image can be formed on the screen 10. In this case, a dichroic prism or other combining system of the prior art need not be provided in projection units, so that it is possible to make the backfocus of the projection system 6 be short, and consequently it is possible to make the frontfocus of the projection system 6 be also short. Thus, it is possible to adapt a short-focal length lens as the projection system 6, it is possible to achieve broad-angle projection, and the device size can be reduced. Furthermore, a dichroic prism or other combining system is expensive compared with the projection system 6 or similar, and because the combining system can be omitted, device costs can be lowered. The image display device PJ such as that of this embodiment, is employed in a rear projector, the rear projector can be made thin (compact). Moreover, because a combining system such as that of the prior art is not necessary, the task of positioning light valves and the combining system or the positioning mechanism, can be omitted or simplified, so that costs can be further reduced. By installing further projection clusters as appropriate, a rear projector can be realized which has a large screen, while remaining thin.

The plurality of projection units of this embodiment include, for red light, S-polarized red light projection units RUs projecting S-polarized red light, and P-polarized red light projection units RUp projecting P-polarized red light. Furthermore, the plurality of projection units of this embodiment include, for green light, S-polarized green light projection units GUs projecting S-polarized green light, and P-polarized green light projection units GUp projecting P-polarized green light. The plurality of projection units of this embodiment include, for blue light, S-polarized blue light projection units BUs projecting S-polarized blue light, and P-polarized blue light projection units BUp projecting P-polarized blue light. The viewer, by wearing glasses 20 having an S-polarized light transmitting film 21 for the left eye which transmits only S-polarized light projected from the S-polarized light projection units RUs, GUs, BUs via the screen 10, and a P-polarized light transmitting film 22 for the right eye which transmits only P-polarized light projected from the P-polarized light projection units RUp, GUp, BUp via the screen 10, can perceive a stereoscopic image.

As a result of a configuration in which the emission faces of the projection units (projection systems 6) are arranged side by side in a prescribed plane (the XZ plane), the freedom of placement of emission faces is enhanced, and emission faces can be arranged in one direction (the X-axis direction) in a prescribed plane, or can be provided stacked in a second direction (the Z-axis direction) differing from the first direction, without significant constraints. Hence compared with cases in which a plurality of spatial light modulation sections are arranged in a complex manner, the structure of the overall device can be simplified, the device size can be reduced, and images based on basic-color light projected from the projection units can be projected in a coordinated manner onto the screen 10 to obtain the desired image (composite image).

Figure 10:
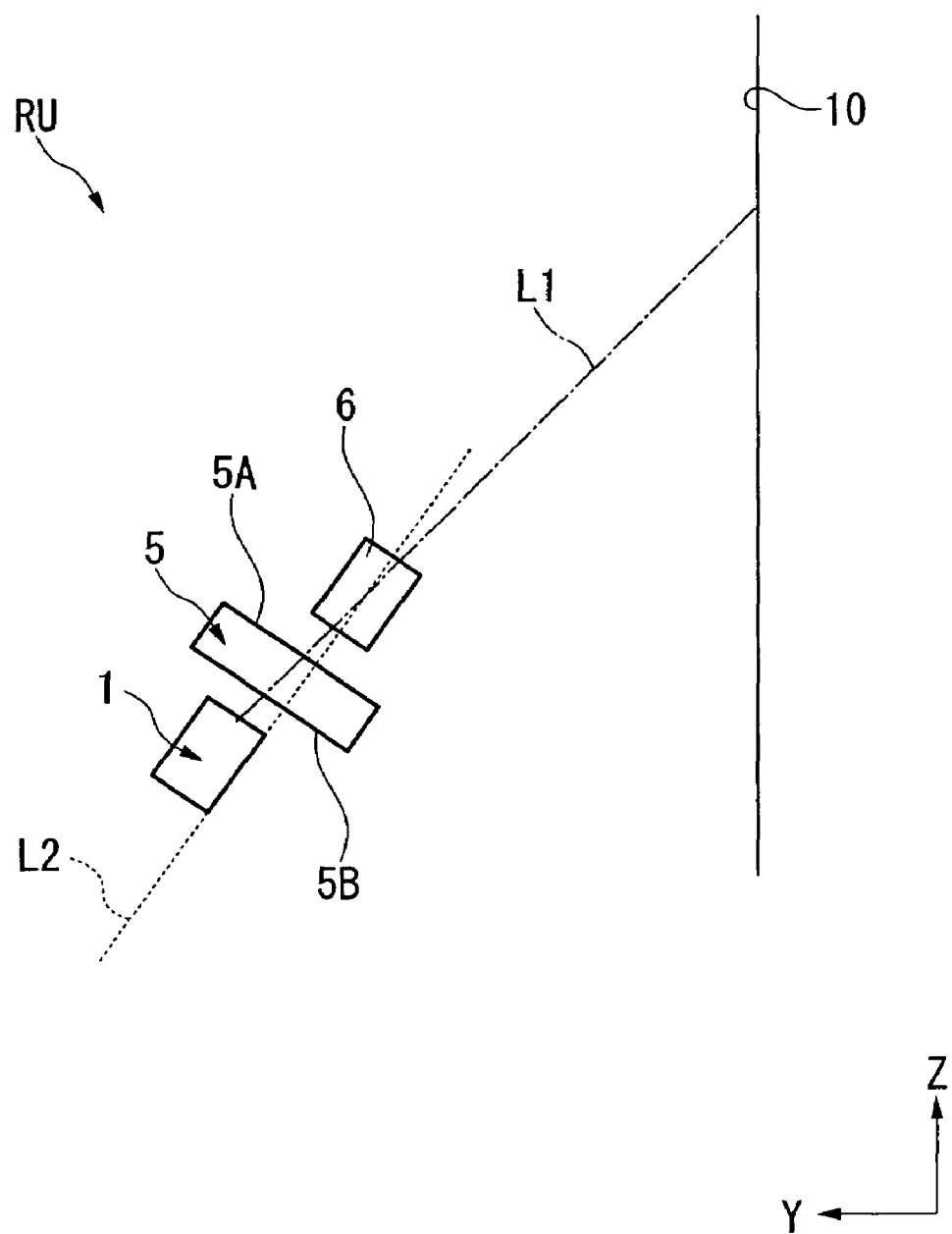
FIG. 10 is a view for explaining a non-perpendicular projection system.

However, from the standpoint of making the projector PJ more compact (thinner), a configuration is conceivable in which the optical axes of the projection systems in each of the projection units are not perpendicular to the screen 10, as shown in FIG. 10. In the case of such a configuration, as for example disclosed in Japanese Unexamined Patent Application, First Publication No. 2002-139794, by positioning the light emission faces of the spatial light modulation sections 5 so as to be perpendicular to the optical axes of the projection systems 6, and by constructing, for projection units, an optical system (a so-called shifting optical system) in which the center axis of the beam emitted from the light emission surface is shifted relative to the optical axis of the projection system 6, distortions on the screen 10 of images projected from each of the projection units can be corrected.

Moreover, the desired image can be projected onto the screen 10 by constructing an optical system (a so-called tilt optical system) such as that disclosed in Japanese Unexamined Patent Application, First Publication No. 2002-139794, in which the center axis of the beam emitted from a spatial light modulation section 5 is made to coincide with the optical axis of a projection system 6, and moreover the light emission face of the spatial light modulation section 5 is positioned to be not perpendicular to the optical axis of the projection system 6, or, by using a correction method such as those disclosed in Japanese Unexamined Patent Application, First Publication No. 9-326981 and Japanese Unexamined Patent Application, First Publication No. 2001-61121.

The images displayed by each of the projection units can be subjected to geometric modification in advance in the display image for each projection cluster, and preprocessing performed to correct unevenness in brightness or color, as disclosed in Japanese Unexamined Patent Application, First Publication No. 2002-72359, so as to obtain a uniform projected image on the screen 10.

This preprocessing is realized through a feedback system employing feedback from an image capture system. In the case of a rear projector, the screen can be observed from the projection side to obtain data for use in preprocessing.

The light sources in the plurality of projection units can be independently turned off or reduced in intensity, so that black levels of projection clusters can be lowered. By this means, a broad modulation dynamic range can be realized for the light projected from projection units.

Fifth Embodiment

Next, the image display device of a fifth embodiment of the invention is explained.

In the following explanation, components which are the same as in the first through fourth embodiments are assigned the same reference symbols, and explanations are omitted.

Figure 11:
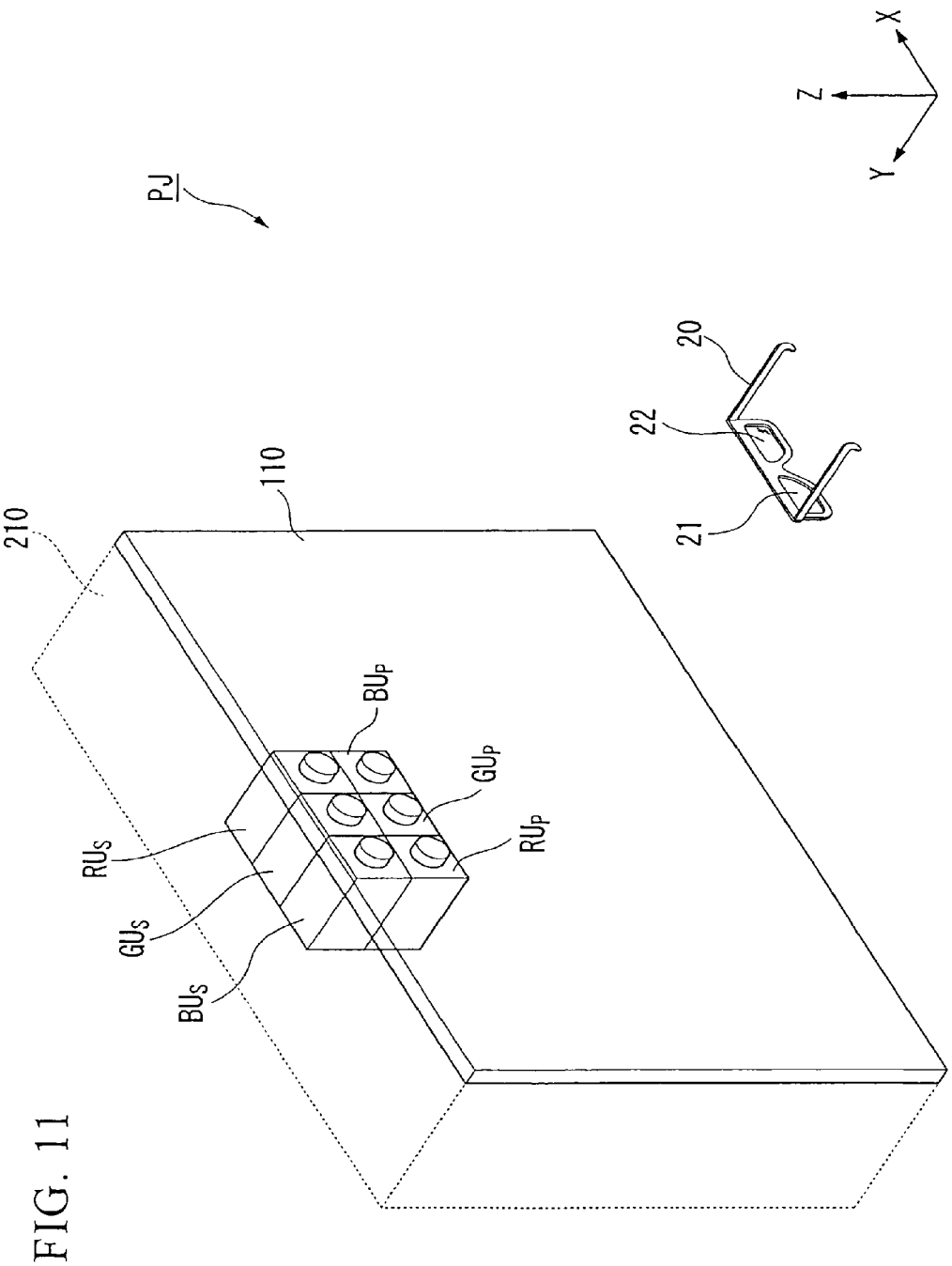
FIG. 11 is a view of a schematic configuration of an image display device in a fifth embodiment.

FIG. 11 is a view of a schematic configuration of the image display device of the fifth embodiment. In FIG. 11, the image display device PJ has a screen (first surface) 110 and a plurality of projection units RUs, RUp, GUs, GUp, BUs, BUp, each of which projects an image onto the screen 110. The images projected by the plurality of projection units RUs, RUp, GUs, GUp, BUs, BUp are combined on the screen 110 to form a composite image on the screen 110. The image display device of this embodiment is a so-called rear projector, or rear-projection type image display device projecting images onto the screen 110 from the rear side of the screen 110. In the following explanation, the image display device shall be called a "projector" as appropriate.

The projection units include the plurality of projection units RUs, GUs, BUs each of which projects an image of S-polarized light in different basic colors onto the screen 110, and the plurality of projection units RUp, GUp, BUp each of which projects an image of P-polarized light in different basic colors onto the screen 110. Specifically, the projector PJ has S-polarized red light projection units RUs, each of which projects S-polarized red light, S-polarized green light projection units GUs, each of which projects S-polarized green light, S-polarized blue light projection units BUs, each of which projects S-polarized blue light, P-polarized red light projection units RUp, each of which projects P-polarized red light, P-polarized green light projection units GUp, each of which projects P-polarized green light, and P-polarized blue light projection units BUp, each of which projects P-polarized blue light. These projection units RUs, RUp, GUs, GUp, BUs, BUp are arranged in a prescribed positional relationship.

Figure 12:
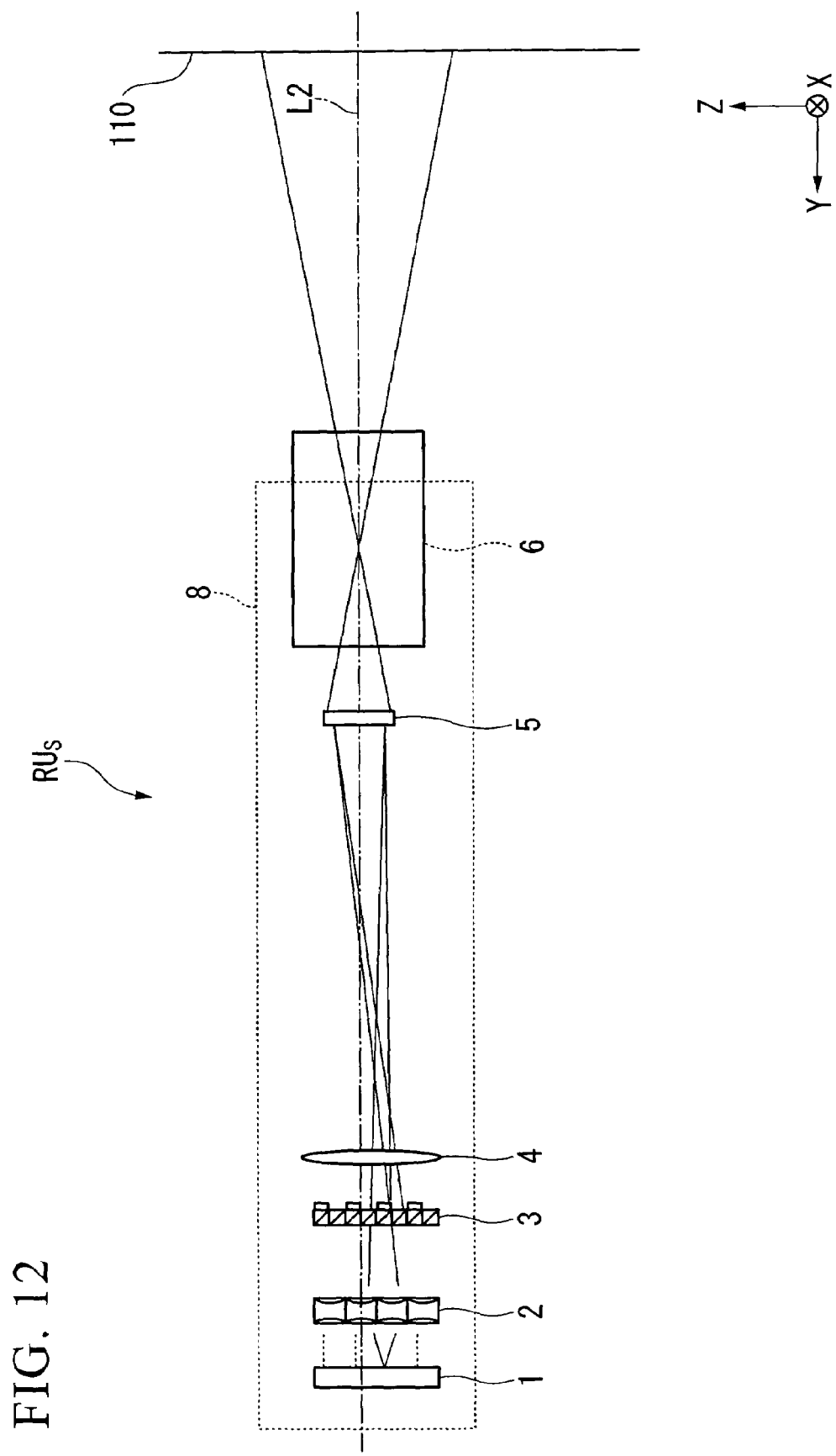
FIG. 12 is a view of a schematic configuration of a projection unit.

Here, the S-polarized red light projection units RUs have substantially the same configuration as the red light projection units RU of the first embodiment. That is, as shown in FIG. 12, the S-polarized red light projection units RUs have a light source section 1, integrator system 2, polarization conversion device 3, lens system 4, spatial light modulation section 5, and projection system (projection optical system) 6. The light source section 1, integrator system 2, polarization conversion device 3, lens system 4, spatial light modulation section 5, and projection system 6 are all held by a holding member (housing) 8.

In such an S-polarized red light projection unit RUs, substantially all of the red light incident on the polarization conversion device 3 is converted into S-polarized light. Furthermore, the red light modulated by the spatial light modulation section 5 (modulated light) is projected onto the screen 110 by the projection system 6. The projection system 6 is a so-called enlargement system which enlarges the image on the incidence side and projects the image onto the screen 110. In this way, an S-polarized red light projection unit RUs projects an image consisting of S-polarized red light onto the screen 110.

In the above, the S-polarized red light projection units RUs are explained, the other projection units RUp, GUs, GUp, BUs, BUp also have configurations which are substantially the same as the projection unit RUs shown in FIG. 10. That is, the light source section 1 in a P-polarized red light projection unit RUp has an LED emitting red light, and the red light emitted from the spatial light modulation section 5 of the P-polarized red light projection unit RUp is P-polarized light. The light source section 1 in an S-polarized green light projection unit GUs has an LED emitting green light, and the green light emitted from the spatial light modulation section 5 of the S-polarized green light projection unit GUs is S-polarized light. The light source section 1 in a P-polarized green light projection unit GUp has an LED emitting green light, and the green light emitted from the spatial light modulation section 5 of the P-polarized green light projection unit GUp is P-polarized light. The light source section 1 in an S-polarized blue light projection unit BUs has an LED emitting blue light, and the blue light emitted from the spatial light modulation section 5 of the S-polarized blue light projection unit BUs is S-polarized light. The light source section 1 in a P-polarized blue light projection unit BUp has an LED emitting blue light, and the blue light emitted from the spatial light modulation section 5 of the P-polarized blue light projection unit BUp is P-polarized light. Polarization conversion devices can be positioned as appropriate on the emission face sides of the projection systems 6 of each of the projection units.

These plurality of projection units RUs, RUp, GUs, GUp, BUs, BUp are provided in a prescribed positional relationship on the rear side of the screen 110. In this embodiment, the plurality of projection units RUs, RUp, GUs, GUp, BUs, BUp are arranged side by side in an array on the rear side of the screen 110. The images respectively projected by the red-light projection units RUs, RUp, green-light projection units GUs, GUp, and blue-light projection units BUs, BUp are combined on the screen 110, to form a full-color composite image on the screen 110. The viewer views, from the front side, the image (composite image) projected onto the screen 110 from the rear side of the screen 110.

Figure 13:
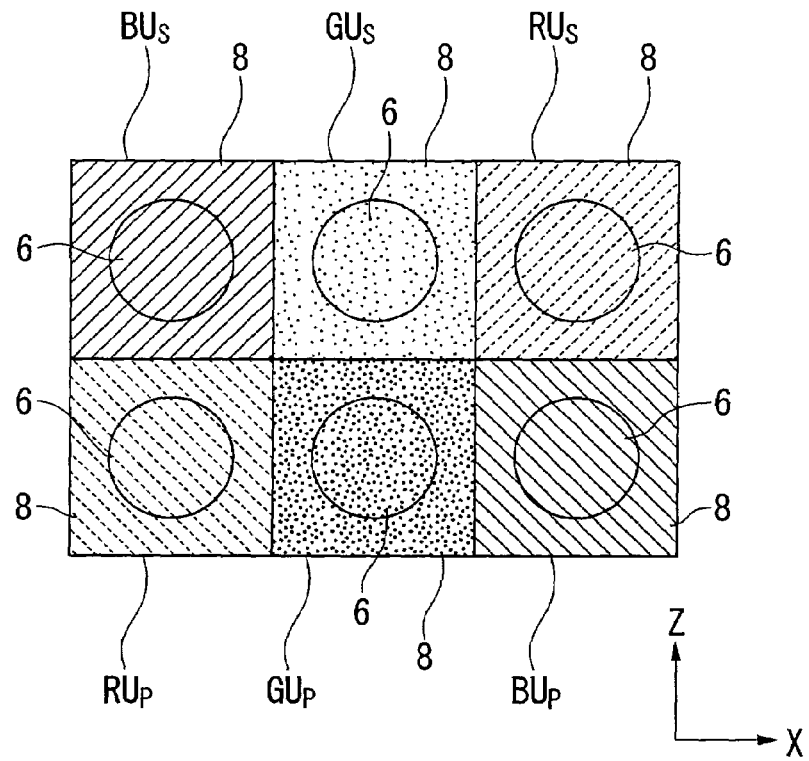
FIG. 13 is a view of an example of an arrangement of projection units.

FIG. 13 is a view of the projection units RUs, RUp, GUs, GUp, BUs, BUp as seen from the light emission face side. The emission faces (emission surface of the projection system 6) of the projection units RUs, RUp, GUs, GUp, BUs, BUp are arranged side by side in a prescribed plane (second plane 210) in a prescribed positional relationship with the screen (first plane) 10. As shown in FIG. 11, in this embodiment the emission faces of each of the projection units RUs, RUp, GUs, GUp, BUs, BUp are arranged side by side and substantially in parallel with the screen 110 in a prescribed plane. In FIG. 11, the screen 110 is substantially parallel to the XZ plane, and the emission faces of the projection units RUs, RUp, GUs, GUp, BUs, BUp are arranged side by side in the XZ plane.

Reflecting members (reflecting mirrors) capable of reflecting the modulated light emitted from the projection units RUs, RUp, GUs, GUp, BUs, BUp may be provided between the screen 110 and the emission faces of the projection units RUs, RUp, GUs, GUp, BUs, BUp, so that the modulated light is projected onto the screen 110 via the reflecting mirrors.

In this embodiment, the emission faces of the projection units RUs, RUp, GUs, GUp, BUs, BUp are arranged in the XZ plane in FIG. 13, along both the X-axis direction and the Z-axis direction. The arrangement of the emission faces of the plurality of projection units RUs, RUp, GUs, GUp, BUs, BUp is set in response to the size (shape) of the screen 110. That is, the screen 110 in this embodiment is of larger size in the X-axis direction than in the Z-axis direction, so that in the plurality of projection units RUs, RUp, GUs, GUp, BUs, BUp, the number of emission faces arranged along the X-axis direction is greater than the number along the Z-axis direction. In this embodiment, as shown in FIG. 13, three emission faces are arranged along the X-axis direction, while two emission faces are arranged along the Z-axis direction.

The emission faces of the plurality of projection units RUs, RUp, GUs, GUp, BUs, BUp are arranged in mutual proximity in the XZ plane. In this embodiment, the housings 8 of the plurality of projection units RUs, RUp, GUs, GUp, BUs, BUp are fixed tightly in a state of close contact by a fixing member, not shown, such that the emission faces of the projection units RUs, RUp, GUs, GUp, BUs, BUp are arranged in proximity.

The projector PJ of this embodiment can be used as a stereoscopic image display device. That is, in order to cause the viewer to recognize the image projected onto the screen 110 as a stereoscopic image, the projector PJ projects S-polarized red, green, and blue light from the S-polarized light projection units RUs, GUs, BUs, as images for viewing by one eye (for example, images for the left eye). The projector PJ projects P-polarized red, green, and blue light from the P-polarized light projection units RUp, GUp, BUp, as images for viewing by the other eye (for example, images for the right eye).

As shown in FIG. 11, the viewer, by wearing glasses 20 having an S-polarized light transmitting film 21 on the left side and a P-polarized light transmitting film 22 on the right side, can perceive a stereoscopic image. Here, the S-polarized light transmitting film 21 on the left side of the glasses 20 functions as a transmission portion for the left eye to transmit only S-polarized light emitted, via the screen 10, from the S-polarized red light projection units RUs, S-polarized green light projection units GUs, and S-polarized blue light projection units Bus, and the P-polarized light transmitting film 22 on the right side of the glasses 20 functions as a transmission portion for the right eye to transmit only P-polarized light emitted, via the screen 10 from the P-polarized red light projection units RUp, P-polarized green light projection units GUp, and P-polarized blue light projection units BUp.

As explained above, a plurality of projection units capable of projecting red light, green light, and blue light are provided, and the images projected by these projection units are combined on a screen 110 to enable formation of the desired full-color composite image on the screen 110. In this case, a dichroic prism or other combining system of the prior art need not be provided in projection units, so that it is possible to make the backfocus of the projection system 6 be short, and consequently it is possible to make the frontfocus of the projection system 6 be short. Thus, it is possible to adapt a short-focal length lens as the projection system 6, it is possible to achieve broad-angle projection, and the device size can be reduced. Furthermore, a dichroic prism or other combining system is expensive compared with the projection system 6 or similar, and because the combining system can be omitted, device costs can be lowered. The image display device PJ such as that of this embodiment, is employed in a rear projector, the rear projector can be made thin (compact). Moreover, because a combining system such as that of the prior art is not necessary, the task of positioning light valves and the combining system or the positioning mechanism, can be omitted or simplified, so that costs can be further reduced.

The plurality of projection units in this embodiment include, for red light, S-polarized red light projection units RUs projecting S-polarized red light, and P-polarized red light projection units RUp projecting P-polarized red light. Furthermore, the plurality of projection units of this embodiment include, for green light, S-polarized green light projection units GUs projecting S-polarized green light, and P-polarized green light projection units GUp projecting P-polarized green light. The plurality of projection units of this embodiment include, for blue light, S-polarized blue light projection units BUs projecting S-polarized blue light, and P-polarized blue light projection units BUp projecting P-polarized blue light. The viewer, by wearing glasses 20 having an S-polarized light transmitting film 21 for the left eye which transmits only S-polarized light projected from the S-polarized light projection units RUs, GUs, BUs via the screen 110, and a P-polarized light transmitting film 22 for the right eye which transmits only P-polarized light projected from the P-polarized light projection units RUp, GUp, BUp via the screen 110, can perceive a stereoscopic image.

As a result of a configuration in which the emission faces of the projection units (projection systems 6) are arranged side by side in a prescribed plane (the XZ plane), the freedom of placement of emission faces is enhanced, and emission faces can be arranged in one direction (the X-axis direction) in a prescribed plane, or can be provided stacked in a second direction (the Z-axis direction) differing from the first direction, without significant constraints. Hence compared with cases in which a plurality of spatial light modulation sections are arranged in a complex manner, the structure of the overall device can be simplified, the device size can be reduced, and images based on basic-color light projected from the projection units can be projected in a coordinated manner onto the screen 110 to obtain the desired image (composite image).

Figure 14:
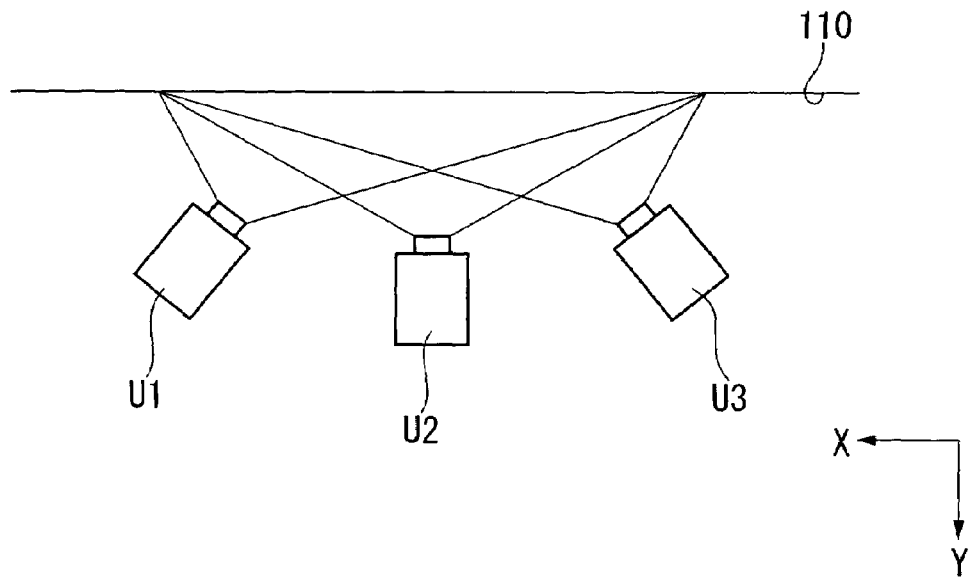
FIG. 14 is a view for explaining a manner of projection of images by projection units.

Furthermore, by arranging the emission faces of the projection units in mutual proximity, distortions in the images projected onto the screen 110 by each projection unit, as well as color shifts arising from the position from which the viewer views the screen 110, can be held to a minimum, and the desired composite image can be obtained. That is, in order to render uniform the magnification at each position on the screen 110 at which an image is projected by a projection unit, the optical axes of the projection systems 6 and the center of the screen 110 must intersect perpendicularly. As indicated schematically in FIG. 14, when the first projection unit U1 is placed in a position opposing the +X edge of the screen 110, the second projection unit U2 is placed in a position opposing the center of the screen 110, and the third projection unit U3 is placed in a position opposing the X edge of the screen 110, the magnifications at each of the positions at which an image is projected by the second projection unit U2 are uniform, but the magnifications at different positions on the screen 110 of the images projected by the first and third projection units U1 and U3 are not uniform, and there is a strong possibility that the images projected by the first and third projection units U1 and U3 will be distorted into a trapezoidal shape. Hence by positioning the emission faces of the projection units in proximity and positioning the emission faces of the projection units in positions opposing the center of the screen 110 to the extent possible, as in this embodiment, distortion (trapezoidal distortion) on the screen 110 of images projected by the projection units can be suppressed, and the desired composite image can be obtained.

Figure 15A:
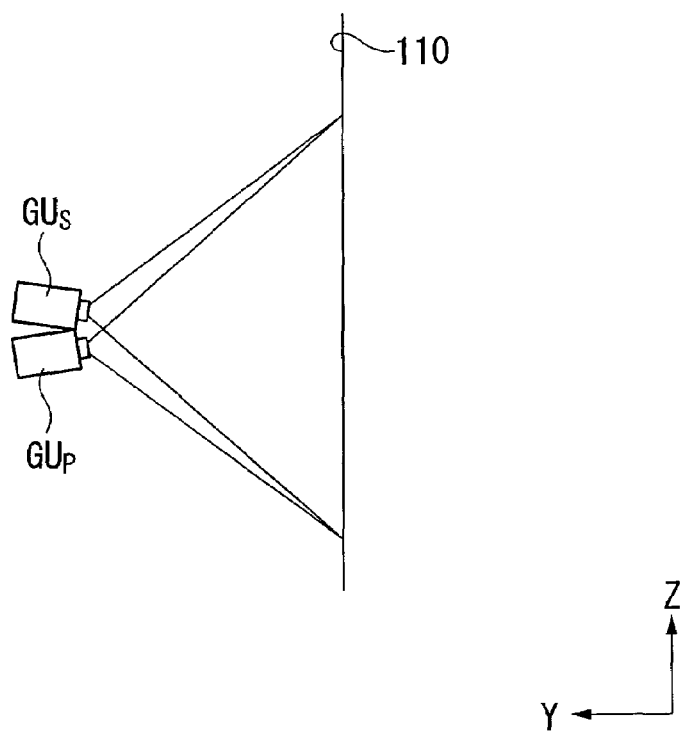
FIGS. 15A and 15B are views for explaining a manner of projection of images by projection units.
Figure 15B:
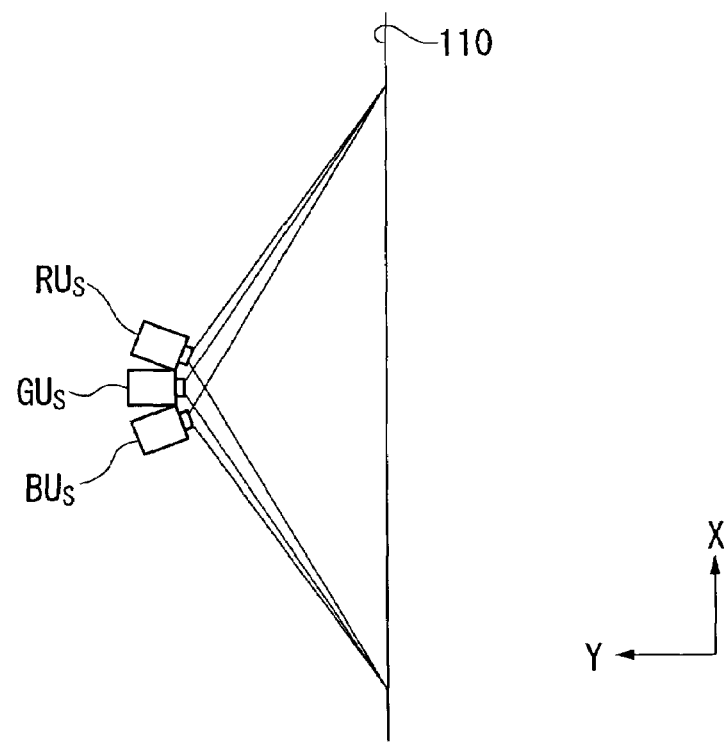
Figure 16:
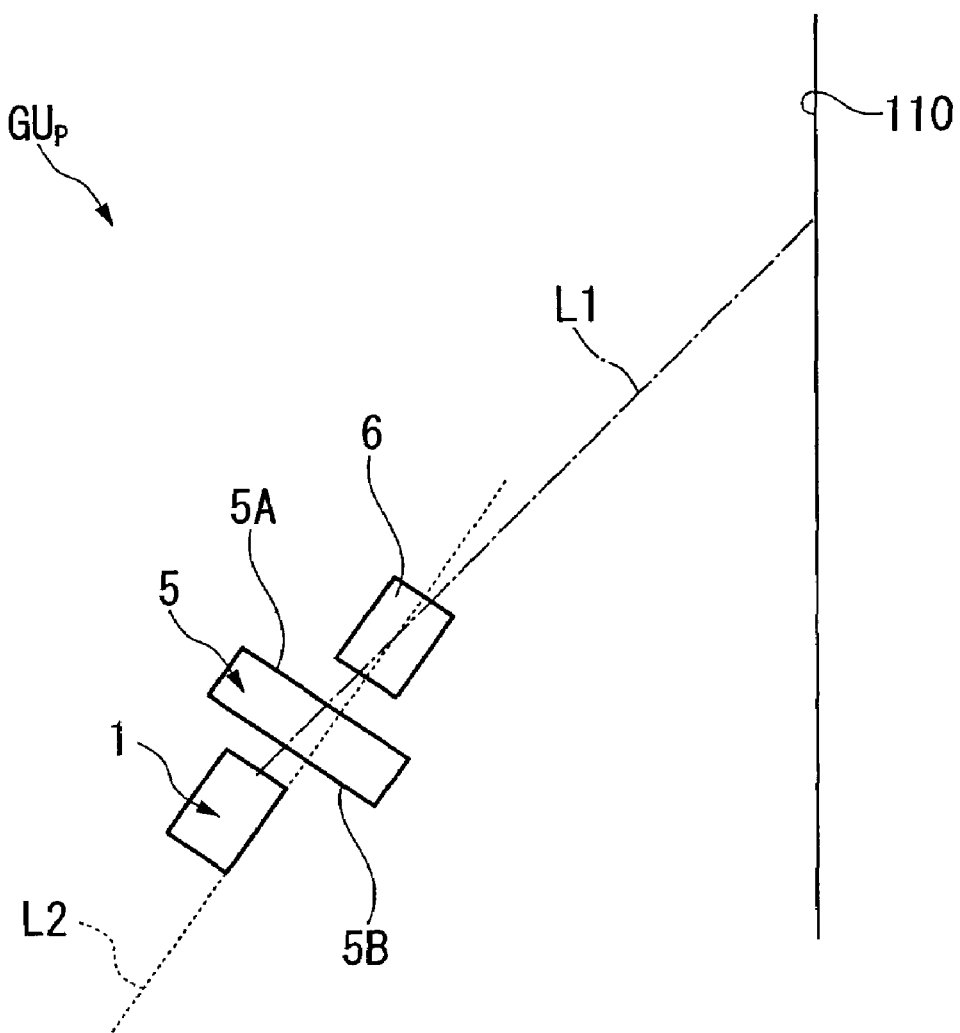
FIG. 16 is a view for explaining a manner of projection of images by projection units.

However, from the standpoint of making the projector PJ more compact (thinner), a configuration is conceivable in which the optical axes of the projection systems in each of the projection units RUs, RUp, GUs, GUp, BUs, BUp are not perpendicular to the screen 110, as shown in FIG. 15A is a view seen from the side of the projector PJ, and in FIG. 151B is a view seen from above. In the case of such a configuration, as for example disclosed in Japanese Unexamined Patent Application, First Publication No. 2002-139794, by positioning the light emission faces of the spatial light modulation sections 5 so as to be perpendicular to the optical axes of the projection systems 6, and by constructing, for projection units RUs, RUp, GUs, GUp, BUs, BUp an optical system (a so-called shifting optical system) in which the center axis of the beam emitted from the light emission surface is shifted relative to the optical axis of the projection system 6, distortions on the screen 110 of images projected from each of the projection units RUs, RUp, GUs, GUp, BUs, BUp can be corrected. As one example, the shifting optical system for a projection unit GUp appears in FIG. 16. FIG. 16 is a view of in simplified form a projection unit GUp.

As shown in FIG. 16, the light emission face SA of the spatial light modulation section 5 is positioned perpendicular to the optical axis L2 of the projection system 6. Furthermore, the light (green light) is irradiated from the light source section 1 in a direction not perpendicular to the light incidence face 5B of the spatial light modulation section 5, such that the center axis (optical path L1) of the beam emitted from the spatial light modulation section 5 and the optical axis L2 of the projection system 6 are shifted.

Moreover, the desired image can be projected onto the screen 110 by constructing an optical system (a so-called tilt optical system) such as that disclosed in Japanese Unexamined Patent Application, First Publication No. 2002-139794, in which the center axis of the beam emitted from a spatial light modulation section 5 is made to coincide with the optical axis of a projection system 6, and moreover the light emission face of the spatial light modulation section 5 is positioned to be not perpendicular to the optical axis of the projection system 6, or, by using a correction method such as those disclosed in Japanese Unexamined Patent Application, First Publication No. 9-326981 and Japanese Unexamined Patent Application, First Publication No. 2001-61121.

Figure 17:
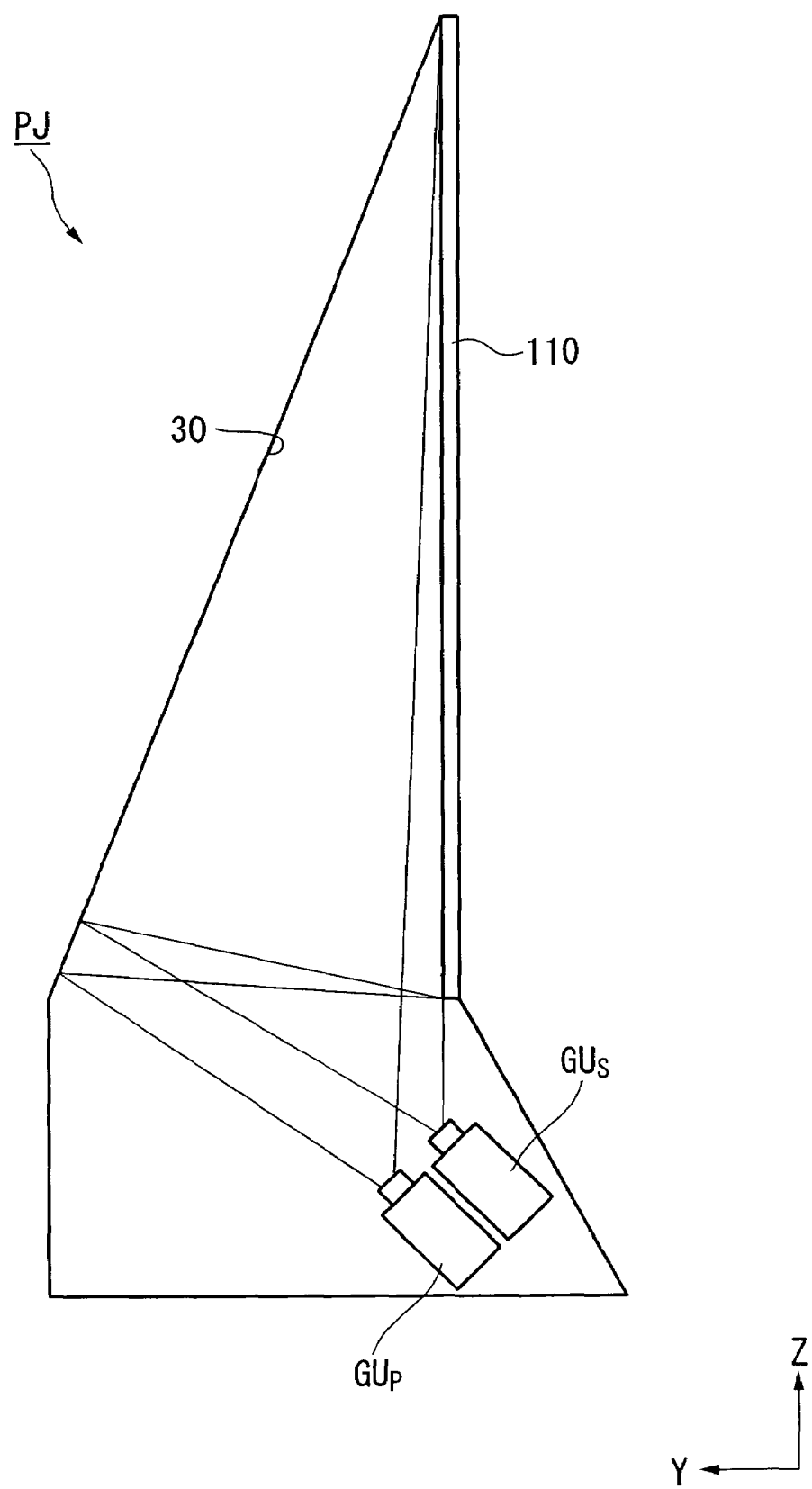
FIG. 17 is a view for explaining a manner of projection of images by projection units.

In the above-described example, the emission faces of projection units are arranged side by side in the XZ plane substantially parallel to the screen 110; but as shown in FIG. 17, the emission faces of the projection units RUs, RUp, GUs, GUp, BUs, BUp may be arranged side by side in a prescribed plane inclined with respect to the screen 110. By this means, the projector PJ can be made thinner. By performing the above-described correction to each of the projection units, the desired image can be formed on the screen 110. Also, reflecting members (reflecting mirrors) 30 capable of reflecting the modulated light emitted from the projection units RUs, RUp, GUs, GUp, BUs, BUp may be provided between the screen 110 and the emission faces of the projection units RUs, RUp, GUs, GUp, BUs, BUp, so that the modulated light is projected onto the screen 110 via the reflecting mirrors 30, and as a result the projector PJ can be made even thinner (more compact).

Sixth Embodiment

Next, a sixth embodiment is explained. In the following explanation, components which are the same as in the above embodiments are assigned the same reference symbols, and explanations are simplified or omitted.

Figure 18:
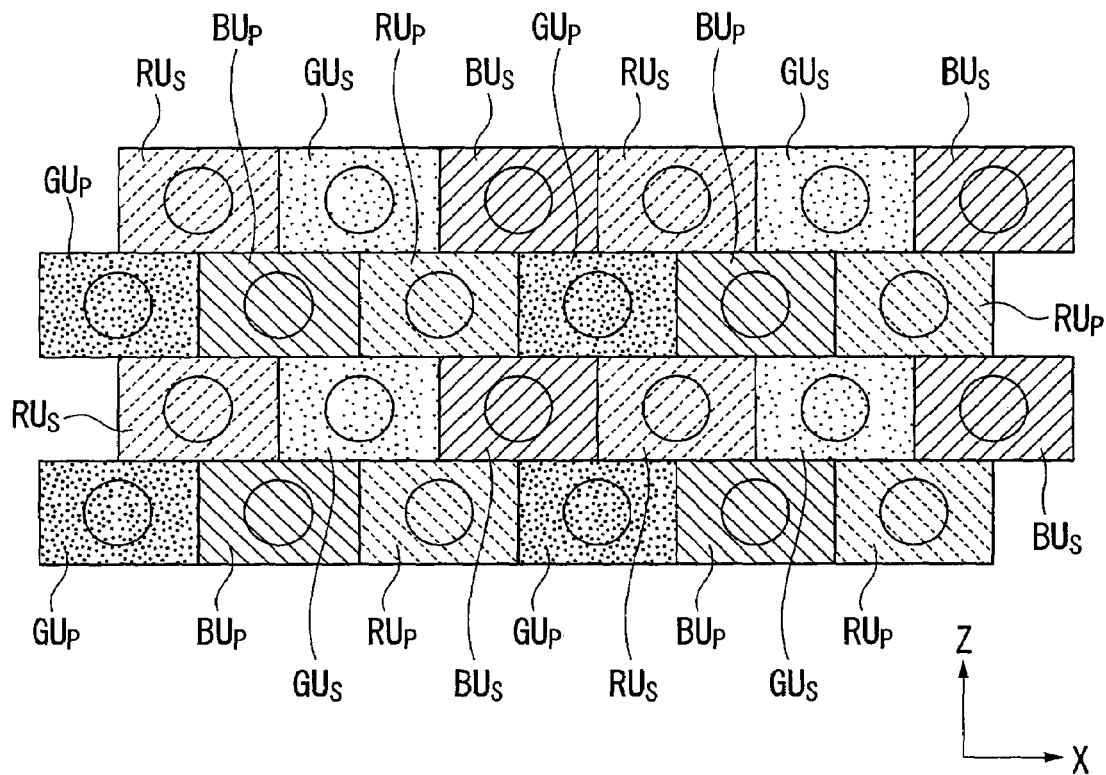
FIG. 18 is a view of an example of an arrangement of projection units in a sixth embodiment.

As the sixth embodiment, an example of arrangement of the emission faces of projection units is explained. FIG. 18 is a view of an example of arrangement of the emission faces of projection units. In FIG. 18, a total of 24 projection units are arranged, with one row in the X-axis direction consisting of six projection units, and four projection units provided in one column in the Z-axis direction. In the drawing, the emission faces of projection units RUs, GUs, BUs emitting S-polarized light are provided in the first and third rows, while the emission faces of projection units RUp, GUp, BUp emitting P-polarized light are provided in the second and fourth rows. In each of these rows, projection units emitting red light, green light, and blue light are arranged side by side in that order. The emission faces of these projection units are arranged in mutual proximity. The first and second rows are shifted in the X-axis direction, the second and third rows are shifted in the X-axis direction, and the third and fourth rows are shifted in the X-axis direction. Each of the emission faces of the red light, green light, and blue light projection units are positioned at the corner points of triangular shapes in the XZ plane. That is, a projection unit emitting red light is positioned at the first vertex, a projection unit emitting green light is positioned at the second vertex, and a projection unit emitting blue light is positioned at the third vertex of a triangle, in a so-called delta arrangement. By arranging the emission faces of the projection units in a delta arrangement, the desired full-color image can be formed.

Figure 19:
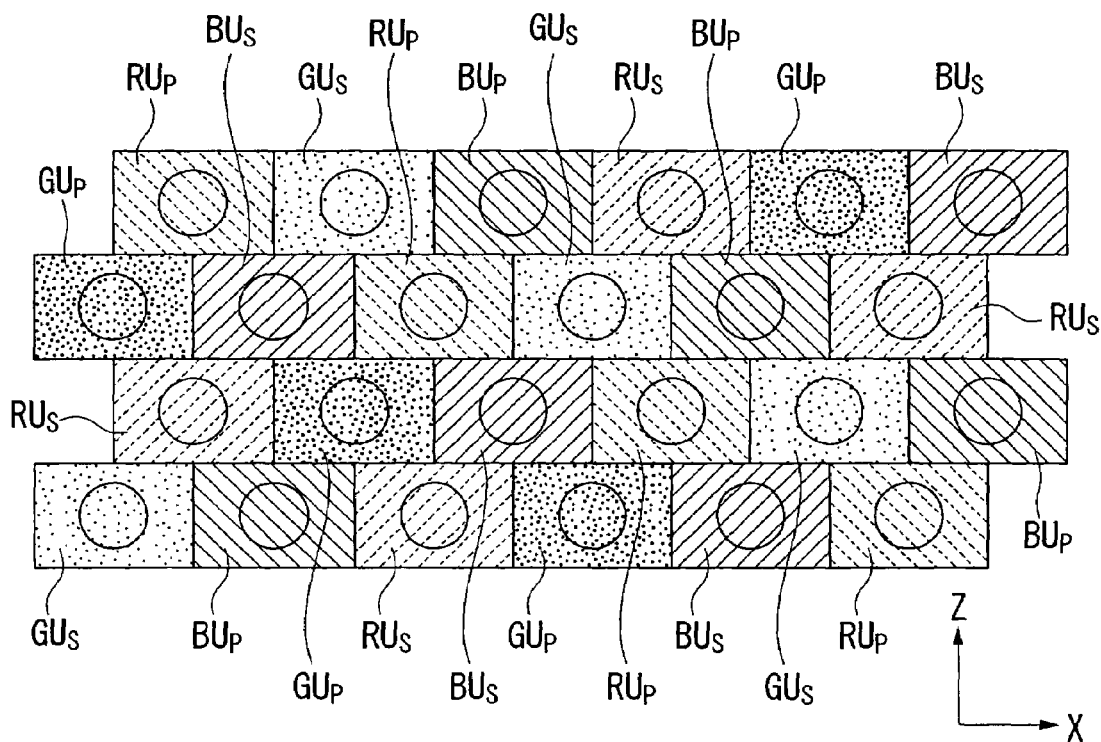
FIG. 19 is a view of an example of an arrangement of projection units.

FIG. 19 is a view of another example. In FIG. 19, projection units emitting S-polarized light and projection units emitting P-polarized light are arranged in alternation in the X-axis direction. Similarly to FIG. 18, the emission faces of the projection units are arranged in a delta array. By means of this configuration also, the desired full-color image can be formed.

As shown in FIG. 18 and FIG. 19, when a plurality of projection units emitting the same basic-color light are provided, images based on the basic-color light emitted from the emission faces of the plurality of projection units emitting the same basic-color light can be projected on the screen 110 so as to be adjacent. By this means, even when the aperture ratio of the light valve of one projection unit is small, the effective brightness and resolution of the image formed on the screen 110 can be improved.

Figure 20A:
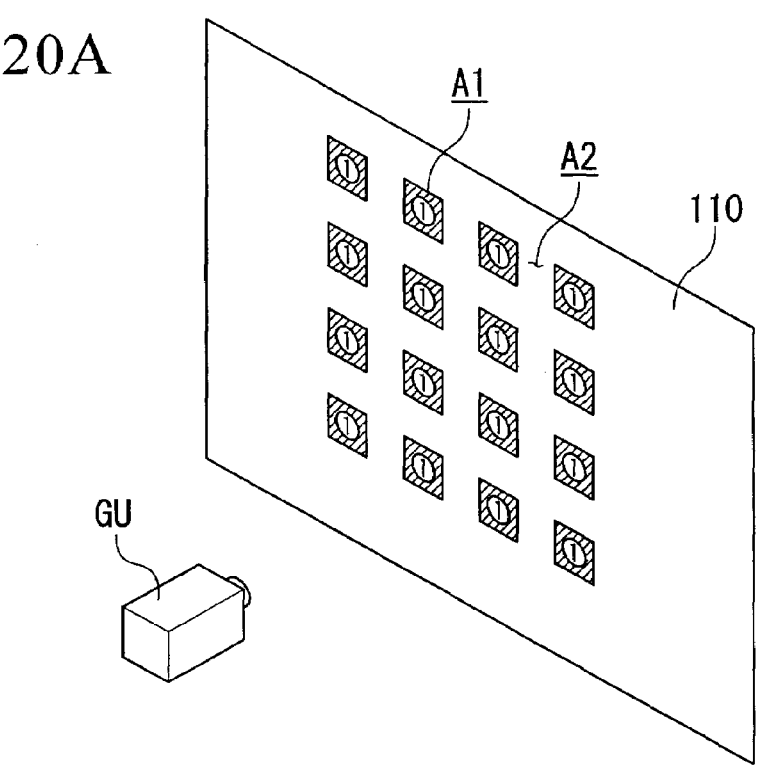
FIGS. 20A and 20B are views for explaining a manner of projection of images by projection units.
Figure 20B:
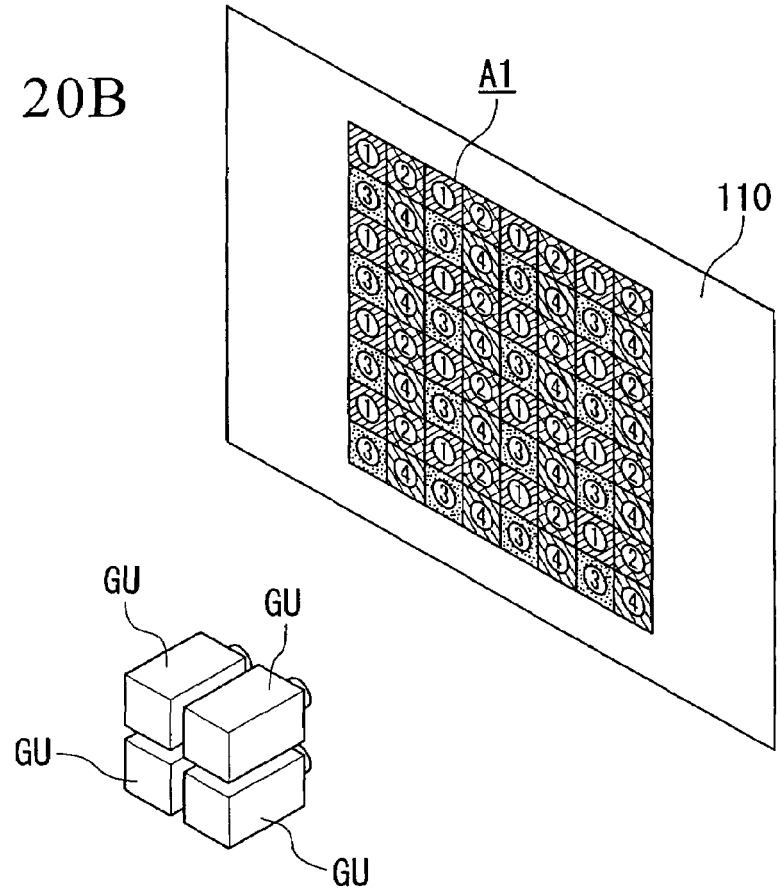

That is, as shown FIG. 20A, for example in a case in which there is one projection unit GU projecting images based on green light, an image is displayed on the screen 110 in response to the aperture ratio of the light valve provided in the projection unit GU. Here the aperture ratio is the ratio of the portion of one pixel through which light is transmitted, excluding the wiring portion and transistor portion (normally covered by the black matrix), to the total area of one pixel. As shown in FIG. 20A, an irradiated area A1 irradiated by light (green light), and a non-irradiated area A2 not irradiated by light, are provided on the screen 110; when the aperture ratio of the light valve provided in the projection unit GU is small, the non-irradiated area A2 on the screen 110 becomes large. In this case, the brightness and resolution on the screen 110 are reduced. However, as shown in FIG. 20B, when a plurality (for example, four) of projection units GU are provided, images based on the light (green light) emitted from the respective emission faces of the plurality of projection units GU are projected onto the screen 110 so as to be adjacent, in other words, by using light emitted from the second projection unit to irradiate the non-irradiated area A2 on the screen based on the light irradiated from the first projection unit among the plurality of projection units, the brightness and resolution on the screen 110 can be improved. Hence even when for example a light valve with a low aperture ratio is used, the brightness and resolution on the screen 110 can be improved to the desired level.

In each of the above embodiments, the projection units have emitted either red light, green light, or blue light as basic-color light. The light colors are not limited to these, and light of any arbitrary colors, may be emitted. Each of the projection units emits basic-color light which is substantially monochromatic, so that the colored light emitted from each of the projection units can be easily adjusted, and by appropriately combining projection units, a projector PJ capable of emitting numerous colors of light can be devised.

In each of the above embodiments, examples were explained of cases in which an image display device of this invention was applied to a rear projection-type image display device (rear projector) projecting images onto a screen 110 from the rear side of the screen 110. As an image display device, an image display device projecting images onto the screen from the front side of the screen, may be adapted.

In the above embodiments, stereoscopic images are formed by projecting light of one basic color having polarizations in orthogonal directions onto a screen 110. The polarization directions are not limited to S-polarization and P-polarization which are linear polarizations. The right-circular polarization and left-circular polarization that are circular polarizations, may be used.

In the above embodiments, examples were explained of application of an image display device of this invention to stereoscopic image display devices. As the devices, display two-dimensional images, may be adapted. In this case, light having orthogonal polarization directions need not be projected onto the screen 110. That is, light having the same polarization direction projected from each of the projection units, may be adapted.

In the above embodiments, LEDs were used as light source sections; but any other means capable of emitting basic-color light, such as for example solid state lasers excited by laser diodes, may be used.

In the above embodiments, liquid crystal devices (light valves) were used as spatial light modulation sections; however, reflective-type light modulation devices (mirror modulators), such as DMDs (Digital Micromirror Devices), or similar, may be used.

What is claimed is:

1. An image display device comprising
    a plurality of projection units, each of which having a light source section emitting one of basic-color lights, a spatial light modulation section modulating the basic-color light emitted from the light source section according to an image signal, and a projection system projecting an image based on the basic-color light modulated by the spatial light modulation section onto a screen, wherein
    the projection units are arranged in an array, and a plurality of the images, each of which is projected by each of the projection units, are combined on the screen to form a composite image, and
    wherein the images projected by adjacent projection units emitting the same basic-color light are arranged so as to be partially superposed at peripheral portions of the images.

2. The image display device according to claim 1, wherein the projection units are orthogonally arranged in a grid array arrangement.

3. The image display device according to claim 1, wherein the images based on the basic-color lights combined on the screen are superposed in areas corresponding to an orthogonal grid array arrangement of the projection units.

4. The image display device according to claim 1, wherein the projection units are arranged in a staggered array arrangement.

5. The image display device according to claim 1, wherein the images based on the basic-color lights combined on the screen are superposed in areas corresponding to a staggered array arrangement of the projection units.

6. The image display device according to claim 1,
    wherein the projection units include:
        a plurality of first polarized light projection units each of which projecting an image of a first polarization; and
        a plurality of second polarized light projection units each of which projecting an image of a second polarization, and
    wherein each of the first polarized light projection units projects onto the screen the image formed from one of the basic-color lights, each of the second polarized light projection units projects onto the screen the image formed from one of the basic-color lights, and the images projected by the first polarized light projection units and by the second polarized light projection units are combined on the screen to form a composite image.

7. The image display device according to claim 6, further comprising glasses having a transmission portion for one eye of a viewer which transmits only the first polarized light projected from the first polarized light projection units via the screen, and a transmission portion for the other eye of the viewer which transmits only the second polarized light projected from the second polarized light projection units via the screen.

8. The image display device according to claim 6, wherein the first polarized light projection units and the second polarized light projection units are orthogonally arranged in a grid array arrangement.

9. The image display device according to claim 6, wherein the images, each of which is formed from one of the basic-color lights, combined on the screen to form a composite image are superposed in an area corresponding to an orthogonal array arrangement of the first polarized light projection units and the second polarized light projection units.

10. The image display device according to claim 6, wherein the first polarized light projection units and the second polarized light projection units are arranged in a staggered array arrangement.

11. The image display device according to claim 6, wherein the images, each of which is formed from one of the basic-color lights, combined on the screen to form a composite image are superposed in an area corresponding to a staggered array arrangement of the first polarized light projection units and the second polarized light projection units.

12. The image display device according to claim 1, wherein the spatial light modulation section has a light emission face emitting the basic-color light, the light emission face is positioned to be perpendicular to an optical axis of the projection system, and a center axis of a light beam emitted from the light emission face is shifted from the optical axis of the projection system.

13. An image display device comprising
    a plurality of projection units, each of which having a light source section emitting one of basic-color lights, a spatial light modulation section modulating the basic-color light emitted from the light source section in response to an image signal, and a projection system projecting an image based on the basic-color light modulated by the spatial light modulation section onto a first surface,
    wherein the projection units include:
        a plurality of first polarized light projection units each of which projecting an image of a first polarized light; and
        a plurality of second polarized light projection units each of which projecting an image of a second polarization, and
    wherein each of the first polarized light projection units projects onto the first surface the image formed from one of basic-color lights, each of the second polarized light projection units projects onto the first surface the image formed from one of the basic-color lights, and the images projected by the first polarized light projection units and by the second polarized light projection units are combined on the first surface to form a composite image, and wherein each of the projection units has an emission face emitting one of the basic-color lights, and the emission faces are arranged side by side on a second surface which is in a prescribed position with respect to the first surface.

14. The image display device according to claim 13, further comprising glasses having a transmission portion for one eye of a viewer which transmits only the first polarized light projected from the first polarized light projection units via the first surface, and a transmission portion for the other eye of the viewer which transmits only the second polarized light projected from the second polarized light projection units via the first surface.

15. The image display device according to claim 13, wherein the emission faces are arranged side by side on the second surface, in a first direction and in a second direction different from the first direction.

16. The image display device according to claim 13, wherein the emission faces are arranged in mutual proximity on the second surface.

17. The image display device according to claim 13, wherein each of the projection units has an emission face emitting one of the basic-color lights, and at least two of the projection units project from the emission faces basic-color lights being the same each other so that images of the same basic-color light are projected adjacent to each other on the first surface.

18. The image display device according to claim 13, wherein the projection units include:

a first basic-color light projection unit projecting a first basic-color light;

a second basic-color light projection unit projecting a second basic-color light; and a third basic-color light projection unit projecting a third basic-color light, wherein the emission face of first basic-color light projection unit, the emission face of second basic-color light projection unit, and the emission face of third basic-color light projection unit are arranged in a staggered array arrangement on the second surface.

19. The image display device according to claim 13, wherein the spatial light modulation section has a light emission face emitting the basic-color light, the light emission face is positioned to be perpendicular to an optical axis of the projection system, and a center axis of a light beam emitted from the light emission face is shifted from the optical axis of the projection system.

* * * * *

UNITED STATES PATENT AND TRADEMARK OFFICE
CERTIFICATE OF CORRECTION

PATENT NO.       : 7,625,093 B2                                                Page 1 of 1
APPLICATION NO. : 11/388993
DATED            : December 1, 2009
INVENTOR(S)      : Tomio Sonehara It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 562 days.

Signed and Sealed this

Twenty-first Day of December, 2010

David J. Kappos
*Director of the United States Patent and Trademark Office*